(12) United States Patent
Pal

(10) Patent No.: US 11,886,860 B2
(45) Date of Patent: Jan. 30, 2024

(54) DISTRIBUTION OF DIGITAL CONTENT TO VEHICLES

(71) Applicant: RED HAT, INC., Raleigh, NC (US)

(72) Inventor: Dmitri Pal, Chelmsford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/486,899

(22) Filed: Sep. 27, 2021

(65) Prior Publication Data
US 2023/0098599 A1 Mar. 30, 2023

(51) Int. Cl.
| | |
|---|---|
| *G06F 8/65* | (2018.01) |
| *G06N 20/00* | (2019.01) |
| *B60R 16/023* | (2006.01) |
| *G06F 8/71* | (2018.01) |
| *H04L 9/08* | (2006.01) |
| *H04L 9/32* | (2006.01) |

(52) U.S. Cl.
CPC ............ *G06F 8/65* (2013.01); *B60R 16/023* (2013.01); *G06F 8/71* (2013.01); *G06N 20/00* (2019.01); *H04L 9/0825* (2013.01); *H04L 9/3242* (2013.01); *H04L 2209/84* (2013.01)

(58) Field of Classification Search
CPC .. G06F 8/65; G06F 8/71; G06N 20/00; B60R 16/023; H04L 9/0825; H04L 9/3242; H04L 2209/84
USPC .......................................................... 717/172
See application file for complete search history.

(56) References Cited

U.S. PATENT DOCUMENTS

| | | |
|---|---|---|
| 8,204,969 B2 | 6/2012 | Carcerano et al. |
| 10,936,306 B2 * | 3/2021 | Miyake ................. B60R 16/023 |
| 2004/0168153 A1 * | 8/2004 | Marvin ..................... G06F 8/71 |
| | | 717/170 |

(Continued)

FOREIGN PATENT DOCUMENTS

WO     2004086168 A2     10/2004

OTHER PUBLICATIONS

Luan et al., "Engineering a Distributed Infrastructure for Large-Scale Cost-Effective Content Dissemination over Urban Vehicular Networks", 2014, [Online], pp. 1419-1435, [Retrieved from internet on Sep. 1, 2023], <https://ieeexplore.ieee.org/stamp/stamp.jsp?arnumber=6476746> (Year: 2014).*

(Continued)

*Primary Examiner* — S. Sough
*Assistant Examiner* — Zengpu Wei
(74) *Attorney, Agent, or Firm* — Lowenstein Sandler LLP

(57) ABSTRACT

The technology disclosed herein enables a processor to receive, at a distribution unit, a first content request from a distribution electronic control unit (ECU) associated with a vehicle, wherein the first content request reflects one or more filtering criteria, determine whether a content item that satisfies the filtering criteria is stored on a storage device of the distribution unit, responsive to determining that the content item that satisfies the filtering criteria is not stored on the storage device of the distribution unit: send, to a managed content delivery service, a second content request, wherein the second content request includes the filtering criteria, and receive, from the managed content delivery service, the content item that satisfies the filtering criteria, and send the content item that satisfies the filtering criteria to the distribution ECU associated with the vehicle.

16 Claims, 19 Drawing Sheets

(56) References Cited

U.S. PATENT DOCUMENTS

| | | | |
|---|---|---|---|
| 2011/0320089 A1* | 12/2011 | Lewis | H04L 9/3226 |
| | | | 380/278 |
| 2014/0336868 A1 | 11/2014 | Breed | |
| 2016/0170775 A1* | 6/2016 | Rockwell | G06F 13/4282 |
| | | | 713/100 |
| 2017/0322791 A1* | 11/2017 | Tiles | G06F 8/65 |
| 2019/0184916 A1* | 6/2019 | Troia | H04W 12/04 |
| 2019/0215325 A1* | 7/2019 | Glass | H04W 4/46 |
| 2019/0265965 A1 | 8/2019 | Acharya | |
| 2019/0391800 A1* | 12/2019 | Lin | H04L 67/34 |
| 2022/0179641 A1* | 6/2022 | Harata | B60R 16/02 |
| 2022/0244946 A1* | 8/2022 | Ishikawa | G06F 8/654 |

OTHER PUBLICATIONS

Anonymous: "Cache (computing)—Wikipedia",m Sep. 19, 2021, pp. 1-11. Retrieved from the internet on Sep. 8, 2202. https://en.wikipedia.org/w/index.php?title=Cache_)computing)&oldid=1045148264.

European Search Report received for European Patent Application No. 22162088.3—1203, dated Aug. 22, 2022.

Tieto Evry, "OTA Software Update Solution Concept for Next-Gen Vehicles", downloaded Mar. 10, 2021, 5 pages.

Qualcomm, "Qualcomm Introduces Car-to-Cloud Service for Over-the-Air Vehicle Updates and On-Demand Services & Features", Jan. 2020, 4 pages.

eSync Alliance Synopsis of Specification for the eSync OTA Platform V2.0, 2021, pp. 1-10.

\* cited by examiner

Available Content Table 400

| Content Item Identifier | Content Item Properties | | | | | | |
|---|---|---|---|---|---|---|---|
| | Content Provider | Vehicle Manufacturer and Model | Vehicle Model Year(s) | ECU Type | ECU HW Version | Content Item (ECU SW) Version | Content Item Size |
| AMP-1001 | AMP Motors (Car Manufacturer) | AMP Motors, Model 965 | 2020-2021 | Engine Control | 1.2 | 3.3 | 345,535 bytes |
| AMP-1002 | AMP Motors (Car Manufacturer) | AMP Motors, Model 965 | 2020-2021 | Battery Management | 1.1 | 1.2 | 454,271 bytes |
| Elec-1001 | ElecTech (3rd party) | AMP Motors, Model 965 | 2020-2021 | Nav | 2.0 | 2.5 | 3,145,731 bytes |
| Autonom-1001 | Autonom (3rd party) | AMP Motors, Model 965 | 2018-2021 | Driver Assist | 1.0 | 1.3 | 2,414,873 bytes |
| ICE-1000 | ICE Motors (Car Manufacturer) | ICE Motors, Model 300 | 2018-2021 | Engine Control | 1.0 | 1.0 | 837,165 bytes |
| ICE-1001 | ICE Motors (Car Manufacturer) | ICE Motors, Model 300 | 2018-2021 | Speed Control | 1.1 | 1.1 | 628,934 bytes |
| Elec-1002 | ElecTech (3rd party) | ICE Motors, Model 300 | 2021 | Nav | 1.0 | 2.5 | 2,718,328 bytes |

FIG. 4A

Content Subscription Table 500

| Subscribing Distribution Unit (504) | Update Policy (506) | Filtering Criteria | | | | | |
|---|---|---|---|---|---|---|---|
| | | Software Provider (508) | Vehicle Manufacturer and Model (510) | Vehicle Model Year(s) (512) | Vehicle VIN(s) (514) | ECU Type (516) | Content Item Version (518) |
| DU-A (Owner's Garage) | Automatic | AMP Motors | AMP Motors, * | At least 2018 | * | * | * |
| DU-A (Owner's Garage) | Request Approval | Autonom | AMP Motors, Model 965 | 2020-2021 | VIN X-Y | Driver Assist | At least 1.2 |
| DU-B (Service Station) | Automatic | AMP Motors | AMP Motors, Model 965 | * | * | Nav | * |
| DU-B (Service Station) | Automatic | ICE Motors | ICE Motors, Model 300 | At least 2016 | * | * | * |
| DU-B (Service Station) | Request Approval | ElecTech | ICE Motors, Model 300 | * | * | Nav | * |
| DU-A (Owner's Garage) | Automatic | Managed Delivery Service | N/A | N/A | N/A | Dist. ECU | * |
| DU-B (Service Station) | Automatic | Managed Delivery Service | N/A | N/A | N/A | Dist. ECU | * |

Distribution Unit Lookup Table 600

| Distribution Unit | Delivered Content Item ID | Delivered Content Item Version(s) | Dist. Unit Network Address | Dist. Unit Public Key | Installed Dist. Unit. Software Version |
|---|---|---|---|---|---|
| DU-A (Owner's Garage) | AMP-1001 | 1.5 | du-a.domain | [Public Key] | 1.1 |
| DU-B (Service Station) | Elec-1001 | 1.5 | du-b.domain | [Public Key] | 1.2 |

FIG. 6

Vehicle Information Lookup Table 700

| Distribution Unit | Vehicle Properties | | | | |
|---|---|---|---|---|---|
| | Vehicle Manufacturer and Model | Vehicle Model Year | Vehicle VIN(s) | ECU Types | ECU Content Item Versions |
| DU-A (Owner's Garage) | AMP Motors Model 965 | 2020 | VIN X | Engine Control | 3.3 |
| | | | | Battery Mgmt | 1.2 |
| | | | | Nav | 2.5 |
| | | | | Driver Assist | 1.3 |
| DU-A (Owner's Garage) | AMP Motors Model 965 | 2021 | VIN Y | Engine Control | 1.2 |
| DU-B (Service Station) | ICE Motors Model 300 | 2020 | VIN Z | Engine Control | 1.0 |
| | | | | Speed Control | 1.1 |
| | | | | Nav | 2.5 |

FIG. 7

Pending Content Request Table
800

| Distribution Unit | Vehicle Identifier | Requested Content Item ID | Request State |
|---|---|---|---|
| DU-A (Owner's Garage) | AMP Motors Model 985, VIN X | AMP Motors EngineControl v3.3 | 32,835 bytes transferred |
| DU-A (Owner's Garage) | AMP Motors Model 985, VIN Y | ElecTech Nav v2.5 | 523,331 bytes transferred |
| DU-B (Service Station) | ICE Motors Model 300, VIN Z | ICE Motors SpeedControl v1.1 | 0 bytes transferred |

FIG. 8

Distribution ECU Lookup Table
900

| Distribution ECU Identifier | Dist. ECU Vehicle Identifier | Dist. ECU Network Address | Dist. ECU Public Key |
|---|---|---|---|
| DE-1 | AMP Motors Model 965, VIN X | de-1.domain | [Public key] |
| DE-3 | AMP Motors Model 965, VIN Y | de-3.domain | [Public key] |

Distribution ECU Lookup Table
910

| Distribution ECU Identifier | Dist. ECU Vehicle Identifier | Dist. ECU Network Address | Dist. ECU Public Key |
|---|---|---|---|
| DE-2 | ICE Motors Model 300, VIN Z | de-2.domain | [Public key] |

Receive, at a managed content delivery service, a content item from a content provider system, wherein the content item is associated with one or more received content item properties
1110

↓

Identify a distribution unit, where the identified distribution unit is associated with one or more filtering criteria, and the received content item properties satisfy the filtering criteria
1120

↓

Identify, using of the distribution unit's identity, a receiving vehicle
1130

↓

Identify, using the receiving vehicle's identity, one or more first content items that are installed on the receiving vehicle
1140

↓

Determine whether the received content item and the one or more first content items form a consistent set of content items for the receiving vehicle
1150

↓

Responsive to determining that the received content item and the one or more first content items form a consistent set of content items for the receiving vehicle, send the content item to the identified distribution unit
1160

FIG. 11

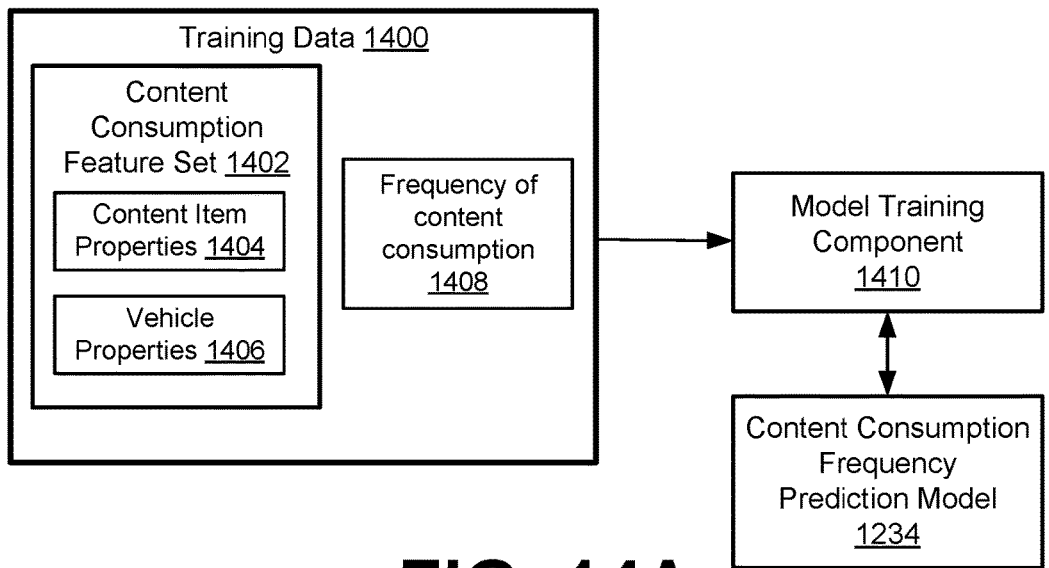

FIG. 14A

| Training Data 1420 ||||||||
|---|---|---|---|---|---|---|---|
| Content Consumption Feature Set 1422 ||||||| Frequency of content consumption 1428 |
| Content Item Properties 1424 |||| Vehicle Properties 1426 ||| |
| Content Item Identifier | Content Provider | Vehicle Manufact-urer and Model | ECU Type | Vehicle Manufact-urer and Model | Vehicle ID | Vehicle Model Year | |
| AMP-1001 | AMP Motors | AMP Motors, Model 9XX | Engine Control | AMP Motors, Model 965 | VID1 | 2021 | 3 per day |
| AMP-1002 | AMP Motors | AMP Motors, Model 9XX | Battery Manage-ment | AMP Motors, Model 965 | VID2 | 2020 | 4 per day |
| Elec-1001 | ElecTech | AMP Motors, Model 9XX | Nav | AMP Motors, Model 965 | VID3 | 2020 | 0.5 per day |
| ICE-1001 | Autonom | AMP Motors, Model 9XX | Driver Assist | AMP Motors, Model 970 | VID4 | 2020 | 1.33 per day |

FIG. 14B

Content Cache Index 1224A

| Content Item Identifier (1502) | Predicted Frequency of Content Consumption (1504) | Content Item Properties | | |
|---|---|---|---|---|
| | | Consumption Count (1506) | Content Item Size (1508) | Content Data File Name (1510) |
| AMP-1001 | 1 per day | 14 | 345,535 bytes | Amp1001 |
| AMP-1002 | 1.5 per day | 11 | 454,271 bytes | Amp1002 |
| Elec-1001 | 0.25 per day | 8 | 3,145,731 bytes | Elec1001 |
| ICE-1001 | 0.1 per day | 4 | 628,934 bytes | Ice1001 |

FIG. 15A

Content Cache Index 1224B

| Content Item Identifier | Predicted Frequency of Content Consumption | Content Item Properties | | |
|---|---|---|---|---|
| | | Consumption Count | Content Item Size | Content Data File Name |
| AMP-1001 | 1 per day | 14 | 345,535 bytes | Amp1001 |
| AMP-1002 | 1.5 per day | 11 | 454,271 bytes | Amp1002 |
| Autonom-1001 | 0.8 per day | 14 | 2,414,873 bytes | Autonom1001 |
| Elec-1001 | 0.25 per day | 8 | 3,145,731 bytes | Elec1001 |

FIG. 15B

DISTRIBUTION OF DIGITAL CONTENT TO VEHICLES

TECHNICAL FIELD

The present disclosure is generally related to computer systems, and more particularly, to delivering content to vehicles via distribution services.

BACKGROUND

Modern vehicles rely on computer systems to perform numerous tasks such as controlling the vehicle's engine or motor, safety systems, navigation systems, and so on. These tasks can be performed by electronic control units ("ECUs") executing computer program code. The program code is ordinarily provided by the vehicle's manufacturer, and is stored on the vehicle, e.g., in persistent storage media. The program code can be stored at the time the vehicle is manufactured and updated at subsequent times, e.g., to fix errors in the program code or add new features. The program code can be updated by the vehicle's manufacturer at a service center by connecting an external computer system to the vehicle via a communication port, or via a wireless computer network.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 4A depicts a diagram illustrating an available content table, in accordance with one or more aspects of the present disclosure;

FIG. 5 depicts a diagram illustrating a content subscription table, in accordance with one or more aspects of the present disclosure;

FIG. 6 depicts a diagram illustrating a distribution unit lookup table, in accordance with one or more aspects of the present disclosure;

FIG. 7 depicts a diagram illustrating a vehicle information lookup table, in accordance with one or more aspects of the present disclosure;

FIG. 8 depicts a diagram illustrating a pending content request table, in accordance with one or more aspects of the present disclosure;

FIGS. 9A and 9B depict diagrams illustrating distribution ECU lookup tables, in accordance with one or more aspects of the present disclosure;

FIG. 11 depicts a flow diagram of an example method for sending a content item to a distribution unit, in accordance with one or more aspects of the present disclosure;

FIG. 14A depicts a high-level block diagram of a training environment for a content consumption frequency prediction model, in accordance with one or more aspects of the present disclosure;

FIG. 14B depicts a diagram illustrating training data for a machine learning model, in accordance with one or more aspects of the present disclosure;

FIGS. 15A and 15B depict diagrams illustrating content cache indexes, in accordance with one or more aspects of the present disclosure;

DETAILED DESCRIPTION

Figure 1A:
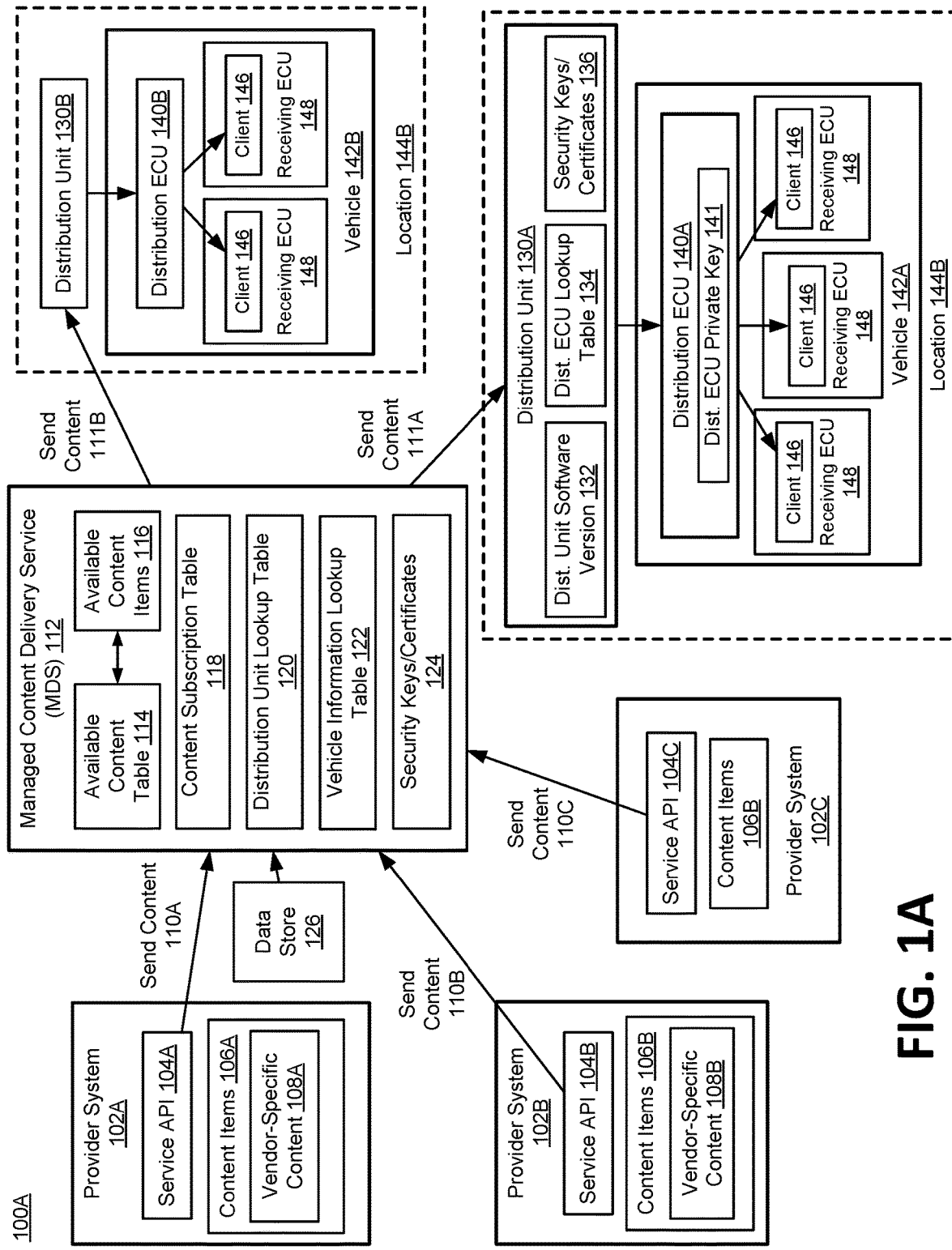
FIGS. 1A and 1B depict a high-level block diagrams of example content delivery pipelines that include provider systems and managed content delivery services, in accordance with one or more aspects of the present disclosure.

Described herein are systems and methods for delivering content, such as software updates, to vehicles from provider systems via a distribution service. Computer systems are used to implement numerous aspects of the operation of vehicles such as cars, trucks, and the like. Vehicle systems such as engines, emission controls, electric motors, brakes, navigation, status displays, entertainment, autonomous driving, and diagnostics perform aspects of the vehicle's operation. Vehicle systems are implemented using computer systems referred to herein as "electronic control units" ("ECUs"). A vehicle may have multiple ECUs, each of which may implement corresponding aspects of vehicle operation. Each ECU may have a processor that executes software program code instructions ("ECU software"), which can include an ECU operating system ("ECU OS") and/or ECU-specific software ("ECU applications") that, when executed by the ECU, cause the ECU to perform tasks related to the aspects of vehicle operation associated with the ECU. ECU software may include program code instructions and data. For example, ECU software executed by an engine control ECU may cause the ECU to control the amount of fuel being provided to the engine. As another example, ECU software executed by an autonomous driving ECU may cause a braking ECU to control the brakes to reduce the vehicle's speed. ECU software can be provided by a software vendor, which may be the vehicle's manufacturer or a third party, such as a manufacturer of a particular ECU. ECU software can be stored on persistent storage media located in the vehicle, such as non-volatile memory coupled to the ECU.

ECU software can be updated to a newer version of the software by loading the newer version of the software into persistent storage media located in the vehicle and updating existing software in the persistent storage media as needed to cause the ECU to execute the newer version. This process of updating the ECU software to a newer version is referred to herein as "installing" the newer version of the software. The newer version is referred to herein as a "software update." The newer version may be provided by a vendor such as the vehicle's manufacturer, and may include new features, enhancements to existing features, or fixes for defects in existing features of the ECU software. The process of installing ECU software can be performed by the vehicle's manufacturer, e.g., at an authorized service center, using specialized tools such as a vehicle maintenance computer system that interfaces with the vehicle. The vehicle maintenance computer system may be provided by the vehicle manufacturer and may receive software updates from the vehicle manufacturer, e.g., via physical media. The vehicle maintenance computer system may install software updates by sending manufacturer-specific instructions and the software update to an ECU on the vehicle via a communications interface such as a diagnostic port, or otherwise causing the software update to be stored on persistent storage media located in the vehicle. This process can be inconvenient for vehicle users or owners, who are expected to being their vehicles to an authorized service center and wait for hours or days until the update has been performed.

In other examples, the installation process may be performed by sending the software update to the vehicle via a communication network that is specific to the vehicle manufacturer. Thus, existing techniques of updating vehicle software are specific to the vehicle's manufacturer. As a result, the effort and resources used to implement vehicle software update techniques are duplicated across manufacturers. As such, many manufacturers continue to use techniques that are time-consuming and inconvenient for vehicle owners or users, such as requiring the update operation to be performed by a service center. Further, since the upgrade processes are proprietary to vehicle manufacturers, third parties are not able to provide innovative features or extensions that could improve the upgrade processes in areas such as efficiency and convenience for users.

Aspects of the present disclosure address the above-noted and other deficiencies by providing technology that includes a managed content delivery service (MDS) that delivers digital content to vehicles, and an open set of interfaces and protocols that providers of vehicle-related content, such as vehicle manufacturers or third-party software vendors, can use to interact with the MDS. The digital content may include software updates, new software modules, content for a vehicle entertainment system, content for a vehicle navigation system, and so on. Each content provider can use a content provider system, such as a computing device having network connectivity, to send content items to the MDS via the network according to a defined MDS interface. Each content items may include content data, which can be, for example, software that can run on electronic control units (ECUs) of vehicles. The software can be, e.g., program code and data. Each content item may also include or be associated with one or more content item properties, which can include one or more data values, e.g., in a name-value pair format or other suitable format. The MDS can send content items to devices referred to herein as "distribution units," which may send the content items to ECUs of specific vehicles. For example, a distribution unit may receive an updated version of software for a vehicle's navigation ECU ("updated software") and send the updated version software to a "distribution ECU" located in the vehicle. The distribution ECU may provide the updated software to a receiving ECU, which may be the vehicle's navigation ECU or other related vehicle ECU. The receiving ECU may install the updated software on the vehicle, e.g., by storing the updated software in a storage device located in the vehicle and updating data stored in the vehicle as needed to indicate that the navigation ECU's software has been updated.

The content download interface may include content request operations that a requesting entity can use to request specified content, such as updated versions of software that runs on specified vehicles or ECUs. The MDS may provide the requested content item as a response to the content request, e.g., as a downloadable file containing the content item and associated content item properties. In this way, the MDS acts as an intermediary between the content providers and the vehicles themselves. That is, the MDS decouples the providers of vehicle-related content, such as software updates, from the process of installing the vehicle content on the vehicles. The MDS interface may be a Representational State Transfer (REST) Application Programming Interface (API) or other type of specified interface having operations that a content provider can use to submit content to the MDS. The MDS interface may specify data formats for content items.

As an example, a content item may be a sequence of bytes, and may be associated with content item properties that specify characteristics of the content item, such as a name and version of the content item, and compatibility properties specifying vehicles or ECUs with which the content item is compatible. A content provider can send a content item to the MDS by invoking an upload operation of the MDS interface and providing the content item and associated content item properties as parameters to the content upload operation. The upload operation may be, e.g., a REST API method of the MDS interface. The content item and associated properties may be sent via the network to the MDS in response to the invocation of the upload operation. The MDS may store the content item and associated properties in a data store and subsequently send the content item to requesting entities via the MDS interface as described below.

The MDS interface may include a content request operation ("content request"), which may be invoked by a requesting system to request that content items matching specified filtering criteria be sent from the MDS to the requesting system. The MDS may send one or more content items matching the specified filtering criteria ("matching content items") to the requesting system in response to the content request. The MDS may send matching content item(s) that are listed in an available content table at the time the MDS receives the content request, as a form of synchronous request processing. Alternatively or additionally, the MDS may send matching content item(s) that the MDS receives subsequent to processing the content request, as a form of asynchronous request processing. The requesting system may be associated with a requesting entity, such as a vehicle manufacturer's service center, a third-party service center, a vehicle owner, or a vehicle user, for example. The requesting system may be a "distribution unit," which may be a computing device at or near a physical location of the requesting entity. The distribution unit may interact with a vehicle and install content on an ECU of the vehicle, as described below.

The content request operations of the MDS interface may include a download request operation, to which the MDS may respond by sending one or more requested content items that are available to the MDS (e.g., identified in the available content table at the time the MDS processes the request operation) and meet specified filtering criteria (e.g., as a form of synchronous request processing). A requesting entity may specify the filtering criteria, such as properties of a desired content item, as parameters to the download request operation. The content download operations may also include a download subscription request operation ("subscription request"). A requesting entity may specify filtering criteria as a parameter to the subscription request. The MDS may send content items (that satisfy the filtering criteria) in response to the subscription operation at one or more subsequent times as the content items that satisfy the filtering criteria become available. For example, the MDS may send an updated content item to a distribution unit in response to the updated content item being received by the MDS from a provider system. The content download operations may be e.g., a REST API methods of the MDS interface.

Upon receiving one or more requested content items, a distribution unit may store the received content items in a content item cache, which may be a data store that is local to or otherwise associated with the distribution unit. The distribution unit may send the received content items to a distribution ECU of a vehicle. The distribution ECU may install the content items on the vehicle, or send the content items to one or more other ECUs of the vehicle. The other ECUs may install the content items on the vehicle as appropriate for each ECU. For example, the distribution ECU may receive an engine management software content item from the distribution unit and determine that the content item corresponds to an engine management ECU of the vehicle. The distribution ECU may send the content item to the engine management ECU via a suitable communication mechanism, e.g., via an internal communication network of the vehicle. The engine management unit ECU may then install the content item, e.g., by storing the content item on a storage device accessible by the engine management ECU so that the engine management ECU will subsequently (e.g., upon being restarted) load the engine management software from the installed content item.

The MDS may verify that the content items provided for download to a particular vehicle in response to a download request are compatible with existing content items that are installed on the vehicle by checking that the versions of the content items to be downloaded for a consistent set of versions. Content items that form a consistent set may be compatible with each other and with any existing installed versions of content items on which the content items to be downloaded depend (or, conversely, which depend on the content items to be installed). If the MDS determines that content items that satisfy a download request from a distribution unit do not form a consistent set, the MDS may identify an alternative consistent set of versions of the content items that are compatible with each other and with the existing installed versions of content items. If the identified alternative consistent set satisfies criteria specified in the download request, then the MDS may send the alternative consistent set of content items to the vehicle, e.g., via a distribution unit.

The systems and methods described herein include technical improvements to a computing environment. In particular, aspects of the present disclosure may enable any provider system that conforms to a MDS interface to provide content, such as program code for ECUs, that can be installed on vehicles authorized to receive the content. A provider system may upload content items to a MDS via the MDS interface, and any system that conforms the MDS interface may download the content items and send the content items to a vehicle for installation. Thus, multiple different content providers may provide content items to the MDS, and the content items from multiple providers may be downloaded and installed on the same vehicle. Various aspects of the above referenced methods and systems are described in details herein below by way of examples, rather than by way of limitation. Thus, multiple providers and/or vehicle manufacturers may use the same MDS, and may implement additional content management and delivery features that interact with the MDS via its defined interfaces.

FIG. 1A depicts a high-level block diagram of an example content delivery pipeline 100A that includes provider systems and MDSs, in accordance with one or more aspects of the present disclosure. It should be noted that other architectures for content delivery pipeline 100A are possible, and that the implementation of a content delivery pipeline utilizing embodiments of the disclosure are not necessarily limited to the specific architecture depicted.

Content delivery pipeline 100A includes provider systems 102, which can send content to MDS 112 via a communications network, as shown by arrows 110. Each provider system 102 may be, for example, a computing device. MDS 112 may include one or more computing devices, e.g., server computer systems.

Each computing device may include one or more physical processors that are capable of executing the computing tasks. A physical processor may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Provider systems 102 may communicate with MDS 112 via a defined interface specified as, for example, a REST API. Each provider system 102 may include a service API 104 that the provider system 102 can use to interact with the MDS 112 according to the defined interface ("the interface"). The interface may include operations, also referred to as "methods," that send content items 106 to MDS 112. The methods may include a POST method that sends a content item 106 to the MDS (e.g., via a network protocol such as Hypertext Transport Protocol (HTTP), a PUT method that updates a content item 106 stored at the MDS, a GET method that retrieves a content item 106 stored at the MDS, and a DELETE method that deletes a content item stored at the MDS. Each method may have corresponding parameters, such as the name or identifier of a content item, properties of the content item (e.g., a set of name-value pairs), and the value of a content item (e.g., a sequence of bytes). MDS 112 may store content items in a data store 126 as available content items 116. MDS 112 may include an available content table 114 that includes the names or identifiers of each content item stored in the data store 126. The available content table 114 may be stored in the data store 126 and/or in memory of a computing device of MDS 112, for example.

MDS may send available content items 116 to distribution units 130 via a communication network, as shown by arrows 111. Each of the distribution units 130 may be a computing device, for example. The communication network used by the defined interface (e.g., the REST API) may be a public network (e.g., the internet), a private network (e.g., a local area network (LAN), a wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that may be implemented using various data processing equipment, communication towers, etc.

Each distribution unit 130 may be a computing device located at a physical location 144, and may communicate with a vehicle 142. The vehicle 142 may be at or near the physical location 144. A distribution unit 130 may communicate with the MDS 112 and may receive data, such as content items, commands, and other information, from the MDS 112. The distribution unit 130 may also communicate with the vehicle 142 by sending data, such as content items, commands, and other information, to a distribution ECU 140 associated with the vehicle 142. The distribution ECU 140 may be a computing device located in the vehicle 142. As an example, a distribution unit 130 may be a mobile device, e.g., a smartphone that communicates with MDS 112 and distribution ECU 140. The distribution ECU may in turn communicate with one or more receiving ECUs 148 of the vehicle via a distribution client 146. Each receiving ECU 148 may be a computing device that performs vehicle-related operations such as engine management, braking, speed control, powertrain control, steering control, navigation, self-driving, diagnostics, and so on. Each receiving ECU 148 may execute program code instructions ("ECU software") that implement features of the ECU.

Distribution units 130 may request content items from MDS 112 by invoking the GET method of the interface of MDS 112 and providing filtering criteria as a parameter to the GET method. MDS 112 may send one or more available content items 116 satisfying the filtering criteria to each distribution unit 130 that invoked the GET method. Further, each distribution unit 130 may request a subscription to content items satisfying specified filtering criteria. As MDS 112 receives content items at subsequent times, MDS 112 may identify content items that satisfy the filtering criteria and send the identified content items to each distribution 130 that requested a subscription to content items satisfying the filtering criteria.

Provider systems illustrated in FIG. 1A include a provider system 102A that includes a service API 104A and content items 106A, which include vendor-specific content 108A. Vendor-specific content 108A may be, e.g., software program code that can execute on a receiving ECU 148 or distribution ECUC 140 of a vehicle 142. Vendor-specific content 108A may include other types of content, such as media content (e.g., graphical images, video, audio or other media), other data (e.g., navigation-related data such as maps and traffic information). Provider system 102A may send content items 106A to MDS 112 via the MDS interface using service API 104A (arrow 110A). Provider system 102B may be associated with or operated by a different entity than provider system 102A, and may provide different content items 106B, e.g., vendor-specific content 108B provided by a different vendor than the vendor-specific content 108A of provider system 102A. Provider system 102B may send content items 106B to MDS 112 via the MDS interface using service API 104A (arrow 110B). A third provider system 102C may send other content items 106C to MDS 112 using service API 104C.

MDS 112 may receive and store content items 106 as available content items 116. The available content items 116 may be stored in data store 126, for example. MDS 112 may retrieve particular available content items 116 from data store 126 in response to a request for the particular available content items 116, and send the particular available content items 116 to distribution units 130 or other recipients that invoke the GET interface method of the MDS interface. MDS 112 may maintain an available content table 114 that contains information about the available content items 116, e.g., an identifier or name of each available content item 116, and one or more content item properties, such as compatible vehicle and ECU information, associated with each available content item 116. MDS 112 may also maintain other data structures, such as a content subscription table 118 that stores information about subscriptions requested by distribution units 130, a distribution unit lookup table 120 that stores information about distribution units 130, a vehicle information lookup table 122 that stores information about vehicles 142, and security keys or certificates 124. Security keys or certificates 124 may include public keys that MDS 112 can use to verify communications received from other components such as provider systems 102 or distribution units 130. Security keys or certificates 124 may also include private keys, such as a private key of MDS 112 that MDS 112 can use to sign information sent to other components.

Distribution unit 130 includes a distribution unit software version 132, which may be a version number associated with program code instructions executed by distribution unit 130. Distribution unit 130 also includes a distribution ECU lookup table 130, which includes information about distribution ECUs 140 of vehicles 142, such as vehicles 142 at a location 144 at or near distribution unit 130, or distribution ECUs 140 with which distribution unit 130 has previously communicated. Distribution unit 130A may also include security keys or certificates 136, such as a distribution unit private key, which distribution unit 130A can use to sign information or communications sent to other components. Security keys or certificates 136 may also include a distribution ECU public key, which distribution unit 130A can use to verify communication from distribution ECU 140A.

Distribution ECU 140A includes a distribution ECU private key 141, which distribution ECU 140A can use to sign information or communications sent to other components (such as distribution unit 130A or receiving ECUs 140). The other components can verify the identity of the distribution ECU using a certificate that includes a public key corresponding to the distribution ECU private key 141. The distribution ECU certificate may be signed by a manufacturer of vehicle 142 or other entity trusted by the other components that verify the identity of the distribution ECU. Verification of the identity of the distribution ECU may also provide assurance of the identity of the vehicle 142. The distribution unit 130, for example, can verify that a vehicle 142 has permission to (e.g., is entitled to or authorized to) receive a particular content item by verifying the identity of the vehicle 142 using the certificate associated with the vehicle's distribution ECU 140 and also verifying that the vehicle 142 has permission to receive the content item according to an access control service or database. This permission verification can prevent delivery of a content item from a provider X to a vehicle manufactured by a vendor (e.g., manufacturer) A unless vendor A has granted permission to provider X to deliver content to vendor A's vehicles. Further, in addition to permission verification, authentication of a user, such as an owner of a vehicle, can be performed. For example, a user may prefer not to update or receive a content item that the user does not use. Further, digital rights management may be performed, e.g., to verify that a user has permission to update or receive a content item from a content item provider. A user can have permission if, for example, the user has a subscription for the content item (e.g., movies) from the content provider.

Distribution ECU 140A may communicate with each receiving ECU 148 via distribution client 146 of the receiving ECU 148. Communications between distribution ECU 140A and each receiving ECU 148 may be via a network or communication bus of vehicle 142A.

Distribution unit 130B may be similar to distribution 130A, but communicates with a different vehicle 142B at a different location 144B. Vehicle 142B includes a distribution ECU 140B through which distribution 130B communicates with receiving ECUs 148 of vehicle 142B.

Figure 1B:
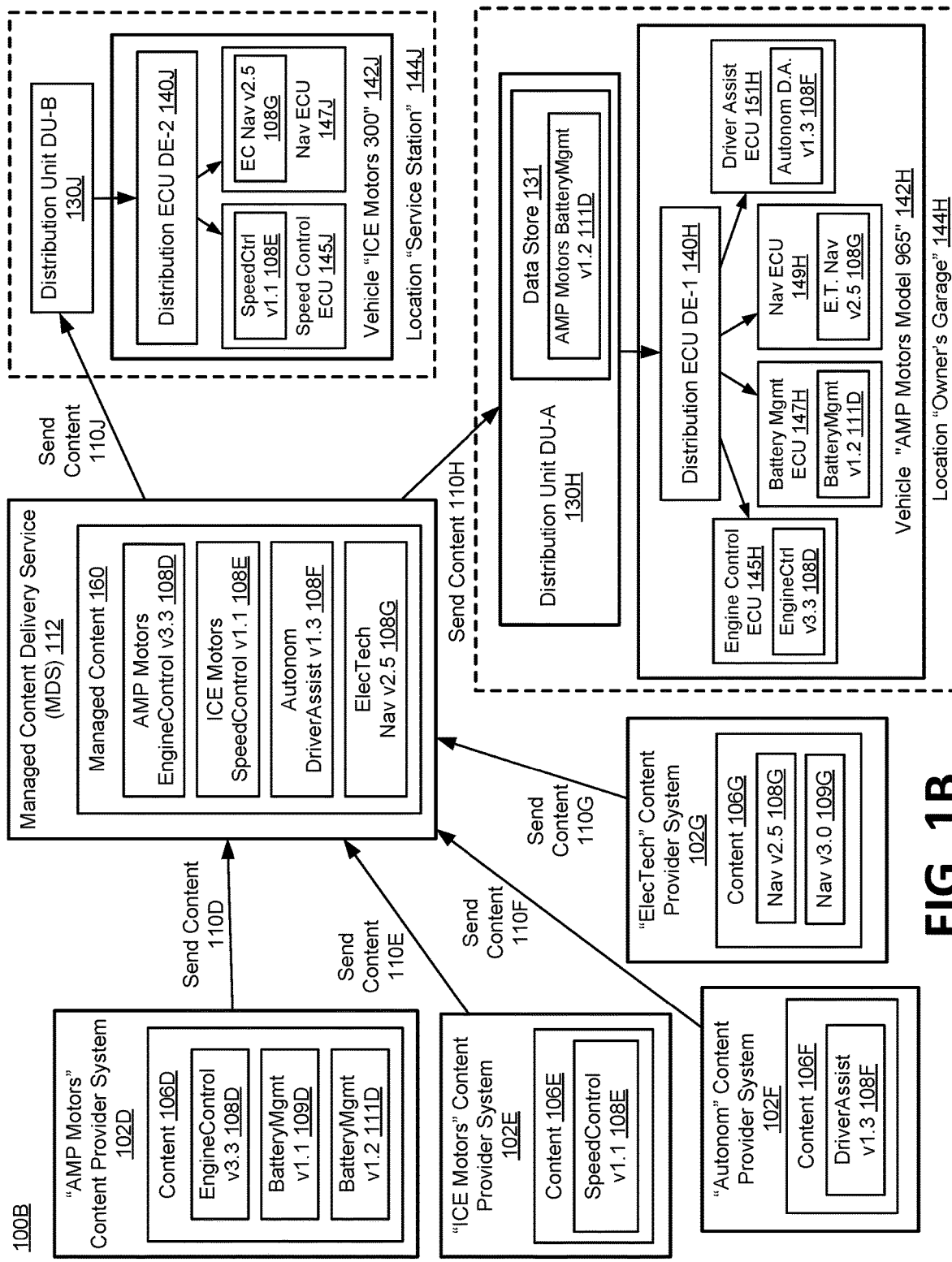

FIG. 1B depicts a high-level block diagram of an example content delivery pipeline 100B that includes provider systems and MDSs, in accordance with one or more aspects of the present disclosure. A content provider system 102D is associated with a vehicle manufacturer named "AMP Motors" and sends content 106D to MDS 112 via a MDS interface (arrow 110D). The content 106D includes three content items: engine control software version 3.3 108D, battery management software version 1.1 109D, and battery management software version 1.2 111D. MDS 112 has received the AMP Motors engine control software 108D from content provider system 102D and has stored the software 108D in data store 126.

A content provider system 102E is associated with a vehicle manufacturer named "ICE Motors" and sends content 106E to MDS 112 via a MDS interface (arrow 110E). The content 106E includes speed control software version 1.1 108E. MDS 112 has received the ICE Motors speed control software 108E from content provider system 102E and has stored the software 108E in data store 126.

A content provider system 102F is associated with a software provider named "Autonom" and sends content 106F to MDS 112 via a MDS interface (arrow 110F). The content 106F includes driver assist software version 1.3 108F. MDS 112 has received the Autonom driver assist software 108F from content provider system 102F and has stored the software 108F in data store 126.

A content provider system 102G is associated with a software provider named "ElecTech" and sends content 106G to MDS 112 via a MDS interface (arrow 110G). The content 106F includes navigation software versions 2.5 108G and 3.0 109G. MDS 112 has received the ElecTech navigation software 108G from content provider system 102G and has stored the software 108G in data store 126.

Distribution unit 130H (named "DU-A") communicates with a vehicle named "AMP Motors Model 965" 142H located in "Owner's Garage" 144H. Distribution unit 130H has received the AMP Motors engine control software 108D, the AMP Motors battery management software 111D, the ElecTech navigation software 108G, and the Autonom driver assist software 108F as content items from MDS via the MDS interface (e.g., by invoking the GET method) (arrow 110H). Distribution unit 130H has sent the received software content items to distribution ECU 140H (named "DE-1"). Distribution ECU 140H has sent the software content items to their respective ECUs 145H, 147H, 149H, 151H, which have installed the respective software content items in the vehicle 142H. Further, distribution unit 130H has stored the software 111D in a data store 131 that is local to distribution unit 130H. The data store 131 may be a storage device, database, or the like. The data store 131 may be included in (e.g., located in) or interfaced with distribution unit 130H, for example. Distribution unit 130H may retrieve content items such as the software 111D from the data store 131 more quickly and efficiently than from the MDS 112, since communication with the MDS 112 is via a network that ordinarily has higher latency of communication with distribution unit 130H than does data store 131.

Distribution unit 130J (named "DU-B") communicates with a vehicle named "ICE Motors 300" 142J located at "Service Station" 144J. Distribution unit 130J has received the ICE Motors speed control software 108E and the ElecTech navigation software 108G as content items from MDS (arrow 110J), and has sent the received software content items to distribution ECU 140J (named "DE-2"). Distribution ECU 140J has sent the software content items to their respective ECUs 145J, 147J, which have installed the respective software content items in the vehicle 142J.

Figure 2:
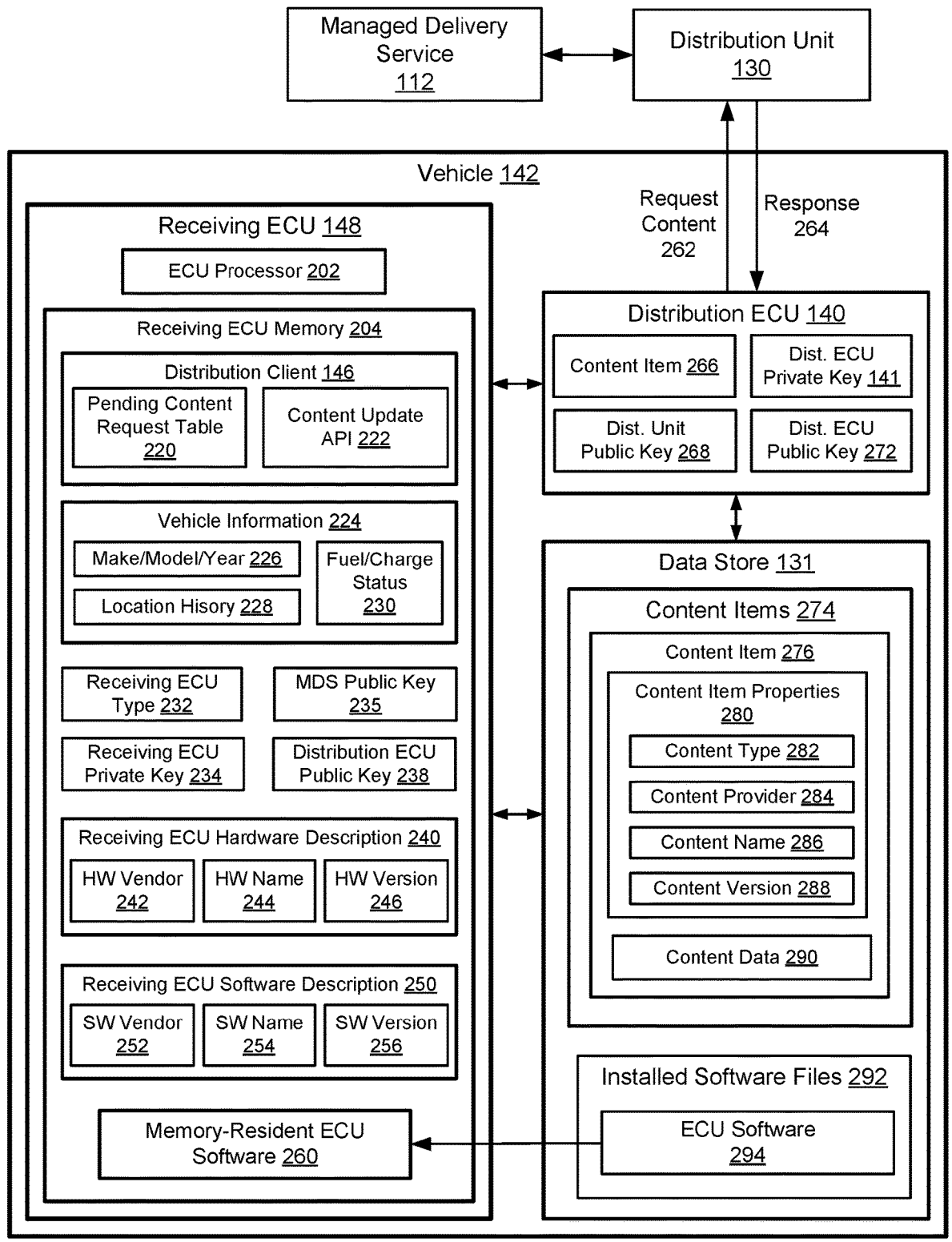
FIG. 2 depicts a diagram illustrating components of a vehicle that interact with a managed content delivery service via a distribution unit, in accordance with one or more aspects of the present disclosure.

FIG. 2 depicts a diagram illustrating components of a vehicle 142 that interact with a MDS 112 via a distribution unit 130, in accordance with one or more aspects of the present disclosure. Vehicle 142 includes at least one receiving ECU 148. Receiving ECU 148 may include an ECU processor 202, which may be, e.g., a physical processor as described above. Receiving ECU 148 may also include receiving ECU memory 204, which may be any virtual memory, logical memory, physical memory, other portion of memory, or a combination thereof for storing, organizing, or accessing data. Data stored in ECU memory 204 may include a distribution client 146, which may include a pending content request table 220 and content update API 222. The pending content request table 220 may represents content requests that are in progress (e.g., are not yet complete, such as a download in progress). The content update API 222 may be, e.g., an interface that distribution ECU 140 may invoke to send content items to the receiving ECU 148 and/or cause content items to be installed in receiving ECU 148 or in vehicle 142 for use by receiving ECU 148.

Receiving ECU memory 24 may also include vehicle information 224, which may include a make (e.g., a manufacturer name), model name, and/or year of vehicle 142. Vehicle information 224 may also include location history 228, which may specify one or more geographic locations of vehicle 142, and corresponding times during which vehicle 142 was at the geographic locations. Vehicle information 142 may also include fuel or charge status 230, which may indicate a level of fuel or electrical charge associated with vehicle 142.

Receiving ECU memory 204 may also include information specifying a receiving ECU type 232, which may indicate a type of the receiving ECU 148, such as engine management, speed control, braking, navigation, or the like. Receiving ECU memory 204 may also include a receiving ECU private key 234, which receiving ECU 148 may use to sign communications sent to other components, a MDS (MDS) public key 235, which receiving ECU 148 may use to verify communications received from the MDS 112, and a distribution ECU public key 238, which receiving ECU 148 may use to verify communications received from distribution ECU 140.

Receiving ECU memory 204 may also include a receiving ECU hardware description 240 and a receiving ECU software description 250. Receiving ECU hardware description 240 may identify a hardware vendor 242 of the ECU (e.g., "AMP Motors"), a hardware name 244 of the ECU (e.g., "Engine Control"), and a hardware version 246 of the ECU (e.g., 1.0). Receiving ECU software description 250 may identify a software vendor 252 of ECU software (such as memory-resident ECU software 260) associated with the ECU (e.g., "AMP Motors" or "Autonom"), a software name 254 of the ECU software (e.g., "Engine Control SW"), and a software version 256 of the ECU software (e.g., 1.0). Receiving ECU memory 204 may also include memory-resident ECU software 260, which may correspond to program code instructions executable by ECU processor 202.

Distribution ECU 140 may request a content item 266 from distribution unit 130 (arrow 262), which may send the requested content item 266 to distribution ECU in a response (arrow 264). Distribution unit 130 may request the content item 266 from MDS 112 if the content item 266 is not available locally at distribution unit 130, as described below. Distribution ECU 140 may store the content item 266 and other information, such as a distribution unit public key 268, a distribution ECU private key 141, and a distribution ECU public key 272, in a memory of vehicle 142. Distribution ECU 140 may use the distribution unit public key 268 to verify communications received from and signed by distribution unit 130 (e.g., a message authentication code of the communications, which may include a hash code of the communications, where the hash code is signed by distribution unit 130 using distribution unit 130's private key). Distribution ECU 140 may use the distribution ECU private key 141 to sign communications sent to other components (e.g., in a message authentication code of the communications). Distribution ECU 140 may send distribution ECU public key 272 to other components, such as distribution unit 130 or receiving ECU 148, and the other components may use distribution ECU public key 272 to verify communications signed and sent by distribution ECU 140. Distribution ECU 140 may receive a certificate that includes the ECU public key 272 and is signed by an authority such as the manufacturer of vehicle 142. Other components may use the certificate to validate the identity of distribution ECU 140 as described above with respect to FIG. 1A.

Distribution ECU 140 may store one or more content items 266 in a data store 131. Data store 131 may be local to distribution unit 140, e.g., as described above with reference to data store 131 of FIG. 1B or FIG. 2. One or more content items 274 may be stored in data store 131. Each content item 276 may include one or more content item properties 280, which may be metadata, and may include, for example, a content type 282 (e.g., computer program code, data, media, or other type), a content provider 284 (e.g., a manufacturer or other provider of the content item 276), a content name 286, and a content version 288. Other example content item properties are shown in FIG. 4A. Each content item 276 may also include content data 290, which may be a representation of the content item (e.g., program code, data, media, or other content) in a form such as a sequence of bytes. Content item properties 280 may also include a file name that identifies the content data 290. One or more installed software files 292 may be stored in data store 131 by an installation process performed by a component such as distribution ECU 140, receiving ECU 148, or distribution unit 130. The installed software files 292 may include ECU software 294, which may be a sequence of program code instructions and associated data. A receiving ECU 148 may load ECU software 294 from data store 131 into receiving ECU memory 204 to form memory-resident ECU software 260.

Figure 3:
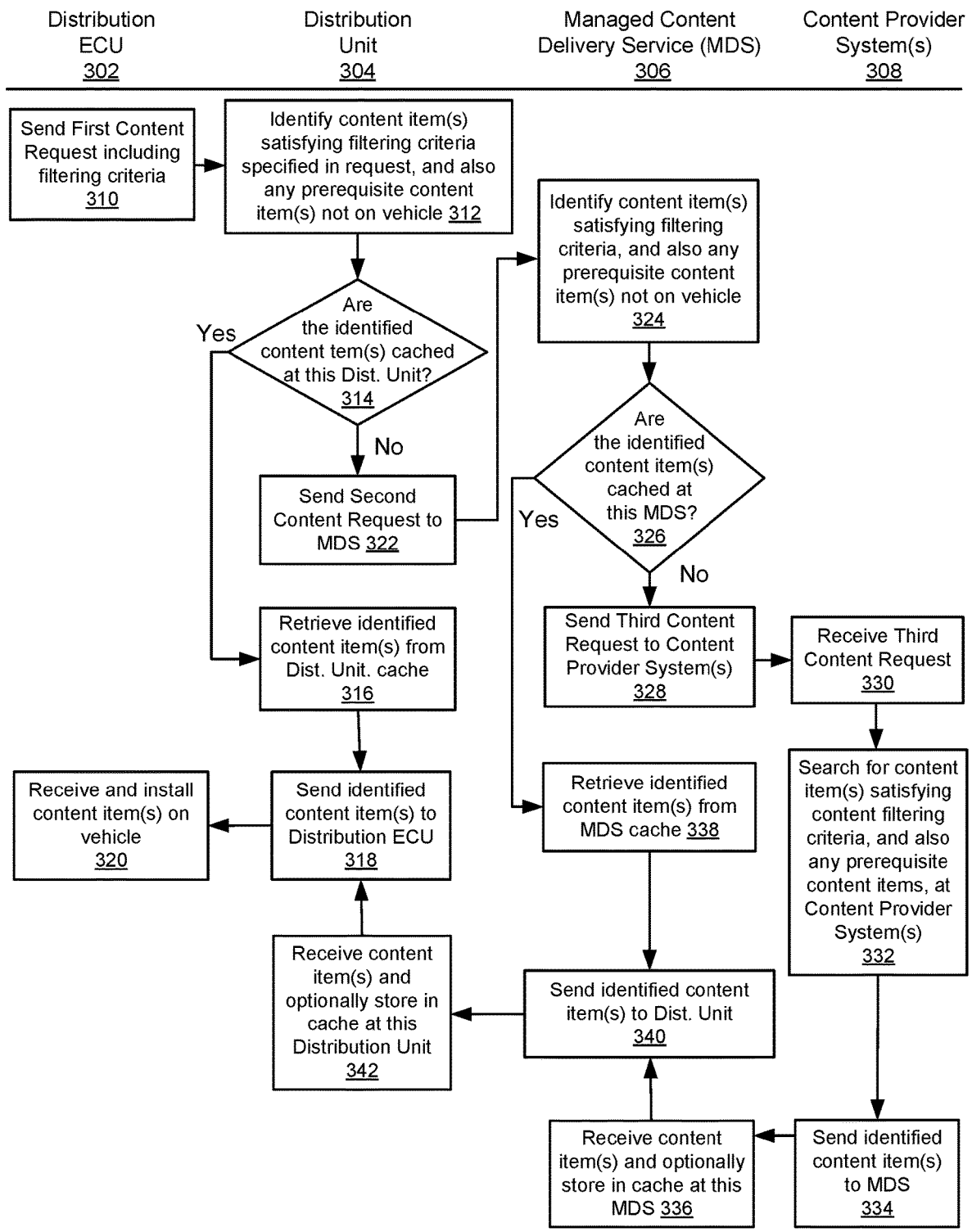
FIG. 3 depicts an interaction diagram illustrating interactions involves in delivering requested content to a distribution ECU of a vehicle, in accordance with one or more aspects of the present disclosure.

FIG. 3 depicts an interaction diagram illustrating interactions involves in delivering requested content to a distribution ECU of a receiving vehicle, in accordance with one or more aspects of the present disclosure. At operation 310, a distribution ECU 302 may send a first content request to a distribution unit 304. The first content request may include filtering criteria, such as one or more properties specifying characteristics of the requested content. The filtering criteria may include a model identifier or VIN number of the receiving vehicle, for example. The distribution unit 304, MDS 306, or content provider system(s) 308 may identify a model and other characteristics of a vehicle by parsing the VIN and querying a vehicle database using a query that includes the VIN. At operation 312, the distribution unit 304 may, in response to receiving the first content request, identify one or more content items satisfying the filtering criteria specified in the first content request. The distribution unit 304 may also identify any prerequisite content items of the content items satisfying the filtering criteria. The prerequisite content items may be prerequisite content items needed by the content items satisfying the filtering criteria. The prerequisite content items do not necessarily satisfy the filtering criteria, but are prerequisites of the content items that satisfy the filtering criteria, so may be sent to the receiving vehicle along with the content items that satisfy the filtering criteria. The distribution unit 304, MDS 306, MDS 306, or content provider system(s) 308 may identify the content items satisfying the filtering criteria by searching an available content table 400, which lists the content items for each available content items and their associated properties, as described below. Similarly, the distribution unit 304, MDS 306, or content provider system(s) 308 may identify the prerequisite content items by searching a content dependency table 450, which lists the prerequisite content items for each available content item, as described below.

At operation 312, the distribution unit 304 may identify one or more content items satisfying the filtering criteria by searching an available content table 400 for records having content item properties 401 that match the filtering criteria. Each matching record represents a particular matching content item satisfying the filtering criteria, and includes a content item identifier 402 that identifies the particular matching content item. If multiple versions of a particular content item satisfy the filtering criteria, then the distribution unit 304 may select the most recent of the multiple versions. For example, if the filtering criteria specifies that the filtering criteria are ECU Type=Engine Control, version=3.3, content provider="AMP motors," and vehicle="AMP Motors Model 965," then a content item having identifier AMP-1001 in the first record (e.g., row) of the content availability table 400 is a matching content item.

At operation 312, the distribution unit may identify one or more prerequisite content items of each matching content item by searching content dependency table 450. For example, to identify prerequisites for AMP-1001 (engine control software v3.3), operation 312 may search content dependency table 450 for a record having a content item identifier 452 that matches AMP-1001. The first record (e.g., row) in table 450 matches AMP-1001, and the prerequisite content item for AMP-1001 is specified by the prerequisite content item(s) 454, which is AMP-1002 (battery management software v1.2) in this example. Thus, in this example, the content item satisfying the filtering criteria is AMP-1001, and the prerequisite content item is AMP-1002.

At operation 312, the distribution unit may optionally verify that the identified content items are compatible with the receiving vehicle, e.g., by comparing the versions of the identified content items, and any hardware type information associated with the identified content items (e.g., ECU types and ECU versions) to minimum compatible version information available from a version compatibility table (not shown). The version compatibility table may specify minimum software versions for particular makes, models, and years of vehicles, and/or for particular ECU types and ECU versions, for example.

Further, at operation 312, the distribution unit 304 may identify and retrieve any additional content items that are later versions of content items currently installed on the receiving vehicle and that the receiving vehicle has permission to receive. The additional content items do not necessarily satisfy the particular filtering criteria specified in the content item request. For example, if the request specified the filtering criteria ECU Type=Engine Control, but an updated version of a content item for another ECU Type is available, e.g., ECU Type=Nav, version=3.0 (where the receiving vehicle has version 2.0 of the Nav content item), and the receiving vehicle has permission to receive version 3.0 of the Nav content item, then operation 312 may include the Nav version 3.0 content item in the additional content items.

Operation 312 may thus prepare for an update or replacement of content items on the receiving vehicle that have not been requested, but for which newer versions are available. The additional updated content items may be, e.g., more recent versions of content items that are installed on the receiving vehicle but will not be replaced by the content items identified at operation 312, for example.

At operation 312, the distribution unit 304 may use an available content table 400 to identify the additional updated content items. For example, if the ElecTech navigation software module having identifier Elec-1001 is not one of the content items matching the filtering criteria and is not a prerequisite for one of the content items matching the filtering criteria, but the most recent version number (e.g., 2.5) of the ElecTech navigation software module (Elec-1001) listed in the available content table 400 is greater than the version number (e.g., 1.0) of the ElecTech navigation software module currently installed on the receiving vehicle, then operation 312 may identify version 2.5 of the ElecTech navigation software module (Elec-1001) as an additional updated content item. Accordingly, the identified additional updated content item (Elec-1001) may be included in the identified content items to be sent to the receiving vehicle.

At operation 312, the distribution unit 304 may identify the additional, more recent versions by generating a list of existing content items that are installed on the receiving vehicle. The list may be generated using a vehicle information lookup table 700 (shown in FIG. 7). The list may be generated from the ECU types 712 and ECU content item versions 714 for each entry in table 700 having a vehicle VIN 710 that matches the receiving vehicle's VIN. For example, the first record (e.g., row) of table 700 indicates that the content items installed on the vehicle "AMP Motors 965" having VIN "X" are Engine Control v3.3, Battery Mgmt v1.2, Nav v2.5, and Driver Assist v1.3.

The distribution unit 304 may identify the additional, more recent versions by, for each existing content item installed on the vehicle (that is not one of the content items to be replaced by a content item identified at operation 312), comparing the content item's version number to a most recent (e.g., greatest) available version number of the existing content item. The most recent available version number may be determined from an available content table 400 (shown in FIG. 4A). The most recent version of a content item for a particular ECU type 410 may be determined from the content item version 414 of a record having a vehicle description (e.g., manufacturer and model 406, and model year(s) 408) that matches the receiving vehicle.

For example, suppose that the most recent available version of the Engine Control software for an AMP Motors 965 is 3.3. Since the vehicle information lookup table 700 indicates that the version of the Engine Control installed on the vehicle having VIN X is 3.3, the Engine Control software installed on that vehicle is up to date, and Engine Control software version 3.3 is not one of the additional, more recent versions for the vehicle having VIN X. As another example, a new version of the Engine Control software is released with version number 3.4, the available content table 400 may be updated (e.g., by the MDS 306 in response to receiving the new version of the content item from a content provider system 102D) to include a record having version number 3.4. In this example, the most recent available version of the Engine Control software for an AMP Motors 965 is 3.4, which is more recent than the version 3.3 software installed on the vehicle having VIN X. Accordingly, at operation 312, distribution 304 may identify version 3.4 in the available content table 400, determine that version 3.4 is more recent than the version listed in the vehicle information lookup table 700 (version 3.3), and include Engine Control software version 3.4 in the identified content items to be sent to the receiving vehicle (e.g., if the receiving vehicle has VIN X).

At operation 312, the distribution unit 304 may optionally determine whether the identified additional updated content items form a consistent set with the content items identified at operation 312. If the identified additional updated content items do not form a consistent set with the content items identified at operation 312, then operation 312 may exclude the identified additional updated content items from the identified content items to be sent to the receiving vehicle.

At operation 314, the distribution unit 304 may determine whether the identified content items are available, e.g., in a cache, at the distribution unit 304. The identified content items may include one or more of: the content items satisfying the filtering criteria, the prerequisite content items, or the additional content items. Content items may be available at the distribution unit 304 if, for example, the content items are stored in a content cache 1220 in data store 131. The data store 131, and thus the content cache 1220, may be local to or otherwise associated with the distribution unit 304. Distribution unit 304 may, for example, maintain a content cache index 1222 as a table that includes identifiers of content items that are stored locally in the data store 131 of the distribution unit 304, and use the content cache index 1222 to determine whether particular content items are stored locally in the content cache 1220.

The distribution unit 304 may determine whether the identified content item(s) are cached at the distribution unit may by searching a content cache index for the content item(s) that satisfy the content request, as described below with reference to FIGS. 12 and 15. The content cache index 1222 may include one or more records, and each record may include a content item identifier and one or more content item properties. If a content identifier of an identified content item is known, the distribution unit may search the content cache index 1222 for a record that has the same content item identifier as the identified content item. Alternatively, the distribution unit may search the content cache index for a record that includes content item properties that correspond to (e.g., match) the filtering criteria's content properties.

If at operation 314 the distribution unit 304 determines that the identified content items are available at the distribution unit 304, e.g., are stored in a distribution unit cache located at the distribution unit 304, then the distribution unit 304 may proceed to perform operation 316, as described below. Otherwise, if operation 314 determines that the identified content items are not available at the distribution unit 304 (e.g., are not in the distribution unit cache), then at operation 322 the distribution unit 304 may send a second content request containing the filtering criteria to the MDS 306. It is possible that some of the identified content items are cached at the distribution unit 304, and some are not, in which case the distribution unit 304 may perform operation 316 (and subsequent operations) for each content item that is cached at the distribution unit 304, and may perform operation 322 (and subsequent operations) for each content item that is not cached at the distribution unit 304.

The distribution unit 304 may optionally determine, e.g., at operation 314, whether the identified content items satisfying the request form a consistent set, e.g., are compatible according to their associated version information, as described below. If the identified content items do not form a consistent set, at least one of the identified content items is incompatible with another of the identified content items, and the distribution unit 304 may proceed to perform operation 322, which sends the second content request.

"Consistent" content items herein shall refer to two or more content items that are compatible with each other according to their version numbers. The distribution unit 304 may determine whether a particular set of content items forms a consistent set by determining whether the version of each content item is compatible with each of the other content items in the set according to a compatibility information data table, for example. For example, if a compatibility information data table (e.g., a version compatibility matrix) indicates that version 3.3 of an engine control software module is compatible with version 1.1 of a battery management software module, then engine control software module version 3.3 and the battery management software module version 1.1 are consistent with each other. As another example, if the compatibility information data table specifies that version 3.3 of the engine control software module is not compatible with version 1.0 of the battery management software module, then engine control software module version 3.3 and battery management software module are not consistent with each other. A "consistent set" herein shall refer to a set of content items in which each content item is consistent with each of the other content items in the set. The MDS 306 may identify and provide a consistent set of content items if the distribution unit 304 determines that a set of content items is not consistent.

At operation 316, the distribution unit 304 may retrieve the identified content item(s) from a distribution unit content cache 1220 as described below with respect to FIG. 12. For each identified content item, the distribution unit 304 may retrieve a record that includes the content item identifier of the identified content item from the content cache index 1222. The distribution unit may retrieve content data 290 from content cache data 1224, which may be identified by a content data file name of the retrieved record. The distribution unit may also retrieve one or more content item properties, such as a content item size, from the retrieved record.

At operation 318, the distribution unit 304 may send the identified content items, including content items identified at operation 312 and additional updated content items (if any) identified at operation 316, to the distribution ECU 302. At operation 318, the distribution unit 304 may digitally sign the identified content items, so that the distribution ECU 302 can verify that the identified content items are generated by a valid distribution unit 304 (e.g., by a valid distribution unit 304 whose security has not been compromised). The distribution unit 304 may send the digital signature to the distribution ECU 302 along with the content item(s). For example, the distribution unit may generate a method authentication code (MAC) of the content item(s) using a secure hash function, and encrypt the secure hash function using a private key of the distribution unit 304.

At operation 320, the distribution ECU 302 receives the identified content items and installs them on the receiving vehicle. The distribution ECU 302 may receive the MAC of the content item(s) from the distribution unit 304 and verify the MAC by computing a hash of the content item(s) using the same secure hash function used by the distribution unit 304. The distribution ECU 302 may then use the distribution unit's public key and the computed hash to verify the MAC value received from the distribution unit 304. If the MAC verification is successful, the distribution ECU 302 may proceed to install the content item(s) on the vehicle.

As described above, if at operation 314, the distribution unit 304 determines that the identified content items are not available at the distribution unit 304, then at operation 322 the distribution unit 304 may send a second content request containing the filtering criteria to the MDS 306. At operation 324, the MDS 306 may receive the second content request, identify one or more content items satisfying the filtering criteria, and identify any prerequisite content items of the content items satisfying the filtering criteria. Operation 324 may also identify any additional updated content items, as described above with reference to operation 312. Thus, operation 324 is similar to operation 312, but is performed by the MDS 306 instead of the distribution unit.

At operation 326, the MDS 306 may determine whether the identified content items are available, e.g., in a cache, at the MDS 306. The identified content items may include one or more of: the content items satisfying the filtering criteria, the prerequisite content items, or the additional content items. Content items may be available at the MDS 306 if, for example, the content items are stored in a cache that is local to or otherwise associated with the MDS 306 (e.g., cached content items may be stored in data store 126 as shown in FIG. 1A). MDS 306 may, for example, maintain an MDS content cache index (similar to the distribution unit's content cache index 1222) that includes identifiers of content items stored locally to the MDS 306. MDS 306 may use the content cache index to determine whether particular content items are stored locally.

If at operation 326 the MDS 306 determines that the identified content items are cached at (e.g., local to) the MDS 306, then the MDS 306 may proceed to perform operation 338. At operation 338, the MDS 306 may retrieve the identified content item(s) from an MDS cache. Operation 338 is similar to operation 316, but is performed by the MDS 306 on an MDS cache.

At operation 340, the MDS 306 may send the identified content items to the distribution unit 304. The identified content items sent to the distribution unit 304 may include content items retrieved from the MDS cache at operation 338, and/or content items received from one or more content provider systems 308, e.g., at operation 336.

If at operation 326 the MDS 306 determines that the identified content items are not available at the MDS 306, e.g., are stored in an MDS cache located at the MDS 306, then at operation 328 the MDS 306 may send a third content request containing the filtering criteria to one or more of the content provider system(s) 308.

The MDS 306 may optionally determine, e.g., at operation 326, whether the identified content items satisfying the request form a consistent set. If the identified content items do not form a consistent set, at least one of the identified content items is incompatible with another of the identified content items, and the MDS 306 may proceed to perform operation 328, which sends the third content request to request content items satisfying the filtering criteria from one or more content system providers 308.

If at operation 326 the MDS 306 determines that the identified content items are not available at the MDS 306, or that the identified content items do not form a consistent set, then at operation 328, the MDS 306 may send a third content request to one or more content provider systems 308. One or more content provider systems 308 may receive the third content request at operation 330. At operation 332, each content provider system 308 that receives the third content request may search for content items satisfying the filtering criteria, and any prerequisite content items of the content items satisfying the filtering criteria. For example, each content provider system 308 may search its content items 106 for the content items. Content items 106 may be stored in a data store local to the content provider system 308, for example. One or more of the provider systems 308 may identify one or more matching content items, including content item(s) that satisfy the filtering criteria received in the third content request and any prerequisite content items of the content items that satisfy the filtering criteria.

At operation 334, one or more content provider systems 308 send the identified content item(s) to the MDS 306. At operation 336, the MDS 306 receives the identified content item(s). At operation 338, the MDS 306 identifies and retrieves (e.g., from a local data store or from a content provider system 308) any additional content items that are later versions of vehicle content items, as described above with reference to operation 316. Operation 336 may also store the received content items locally at the MDS 306, e.g., in an MDS content cache for more efficient subsequent retrieval. For example, operation 336 may perform operations similar to those of FIG. 16 to conditionally add the received content item to the MDS content cache. If the content item satisfies caching criteria, then the MDS 306 may add the content item to the MDS content cache (with eviction of an existing item if the cache is full).

Operation 336 may determine that the caching criteria is satisfied based on whether there is sufficient space available in the MDS content cache to store the received content item, or, if there is not sufficient space available, whether the received content item has been used (e.g., consumed) more frequently than the least-frequently-used content item in the cache. For example, if there is sufficient space available in the MDS content cache to store the received content item, operation 336 may download the content item, store the content item in the MDS content cache, and update a time stamp associated with the content item to indicate that the content item has been used (e.g., by setting the time stamp to a current system time). If there is not sufficient space available in the MDS content cache to store the received content item, then at operation 336 the MDS 306 may evict (e.g., delete from the MDS content cache) one or more less-frequently-used content items, such as one more content items used less frequently than the received content item, and then store the received content item in the cache. If the retrieved content item is used less frequently (e.g., has a timestamp less than the lowest timestamp of the content items in the cache), then the caching criteria is not satisfied, and the received content item is not stored in the cache. The eviction may be performed continuously or periodically in the background by the MDS 306, so that cache space is available to store content items at the MDS 306. Although particular example caching criteria is described herein, any suitable caching criteria may be used in other implementations.

At operation 340, the MDS 306 sends the identified content items to the distribution unit 304. At operation 342, the distribution unit 304 receives the identified content items. Operation 342 may also store the received content items locally at the distribution unit 304 for more efficient subsequent retrieval. For example, operation 342 may perform operations similar to those of FIG. 16 to conditionally add the content item to the distribution unit content cache 1220. If the content item satisfies caching criteria, then at operation 342 the distribution unit 304 may add the content item to the distribution unit content cache 1220 (with eviction of an existing item if the distribution unit content cache 1220 is full), similarly to the storage, retrieval, and eviction of content items from the MDS content cache described above with reference to operation 336.

As described above, at operation 318, the distribution unit may send the identified content items to the distribution ECU 302, and at operation 320, the distribution ECU 302 may receive and install the matching content items on the receiving vehicle associated with the distribution ECU 302.

FIG. 4A depicts a diagram illustrating an available content table 400, in accordance with one or more aspects of the present disclosure. The available content table 400 may be stored at a managed content delivery system (MDS) 112 and/or one or more distribution units 130, for example. The available content table 400 may be generated by MDS 112 from content items received from provider systems 102. The available content table 400 includes a set of records represented by rows. Each record associates a content item identifier with one or more content item properties 401 that characterize the content item that corresponds to the content item identifier. The content item properties include a content provider name 404, a vehicle manufacturer and model 406, a vehicle model year range 408, an ECU type 410, an ECU version 412, a content item version 414 (e.g., a software version if the content item includes computer program code), and a content item size 416 (e.g., in bytes). The six available content items in table 400 are identified by the content item identifiers AMP-1001, AMP-1002, Elec-1001, Autonom-1001, ICE-101, and Elec-1001. For example, the AMP-1001 content item has a content provider 404 of "AMP Motors" (which is a car manufacturer), a vehicle 406 of "AMP Motors, Model 965", vehicle model years 408 of "2020-2021", an ECU type 410 of "Engine Control", an ECU version 412 of "1.2", a content item version 414 of "3.3", and a content item size 416 of "345,535 bytes."

Figure 4B:
FIG. 4B depicts a diagram illustrating a content dependency table, in accordance with one or more aspects of the present disclosure.

FIG. 4B depicts a diagram illustrating a content dependency table 450, in accordance with one or more aspects of the present disclosure. The content dependency table 450 may be stored at a managed content delivery system (MDS) 112 and/or one or more distribution units 130, for example. The content dependency table 450 may be generated by MDS 112 from dependency information received from provider systems 102. The content dependency table 450 includes a set of records represented by rows. Each record associates a content item identifier 452 with one or more prerequisite content item identifiers 454. A prerequisite content item, e.g., AMP-1002, may be a content item referenced by another (dependent) content item, e.g., AMP-1001. If a prerequisite content item is not present, the dependent content item may fail to operate correctly. In the content dependency table 450, the first record associates the content item identifier AMP-1001 with the prerequisite content item identifier AMP-1002, thereby indicating that content item AMP-1002 is a prerequisite for (also referred to herein as a dependency of) content item AMP-1002. The second record indicates that AMP-1002 does not have any dependencies, and may be omitted in other examples. The third record indicates that AMP-1001 is a prerequisite for Elec-1001. The fourth record indicates that AMP-101 and Elec-1001 are both prerequisite for Autonom-1001. The fifth record indicates that ICE-1000 does not have any dependencies, and may be omitted in other examples. The sixth record indicates that ICE-1000 is a prerequisite for ICE-1001. The seventh record indicates that ICE-1000 and ICE-1001 are prerequisites for Elec-1001.

FIG. 5 depicts a diagram illustrating a content subscription table 500, in accordance with one or more aspects of the present disclosure. The content subscription table 500 may be stored at a managed content delivery system (MDS) 112 and/or one or more distribution units 130, for example. The content subscription table 500 may be generated by MDS 112 and/or distribution units 130 from subscription requests received at distribution units 130. The subscription requests may be generated by, for example, a maintainer, owner, or user of the vehicle 142 associated with the distribution unit 130, or an operator or other user of the distribution unit 130, e.g., via a user interface of the distribution unit 130. The content subscription table 500 includes a set of records represented by rows. Each record represents a subscription, e.g., a request from a "subscribing" distribution unit for a sender, e.g., MDS 112, to send content items that satisfy filtering criteria 502 to the subscribing distribution unit. Thus, each record associates a subscribing distribution unit identifier 504 with one or more filtering criteria 502.

The filtering criteria 502 include a software provider criterion 508, a vehicle manufacturer and model criterion 510, a vehicle model year range criterion 512, a vehicle VIN criterion 514, an ECU type criterion 516, and a content item version criterion 518. The filtering criteria 502 may be name-value pairs (also referred to herein as properties). The name may be, e.g., "Software Provider" and the value may be a particular value, e.g., "AMP Motors" or an asterisk ("*"), which indicates that any value can satisfy the criterion represented by the name-value pair. For example, the first record associates a subscribing distribution unit "DU-A" (located at Owner's Garage) with filtering criteria 502 that include a software provider value "AMP Motors", a vehicle manufacturer "AMP Motors", a vehicle model "*" (e.g., any model), a vehicle model year of at least 2018, a vehicle VIN "*" (e.g., any VIN), an ECU type "*" (e.g., any ECU type), and a content item version "*" (e.g., any content item version). Any content item having properties that satisfy these filtering criteria 502 (e.g., software provider="AMP Motors", manufacturer="AMP Motors", and model year >=2018) may be sent to the subscribing distribution unit 504 by the MDS 112. As another example, the second record associates a subscribing distribution unit "DU-A" (located at Owner's Garage) with a software provider criterion 508 of "Autonom", a vehicle manufacturer and model criterion 120 of "AMP Motors, Model 965", a model year criterion 512 of "2020-2021", a VIN criterion 514 of "X-Y" (any value in the range X to Y), an ECU type criterion 516 of "Driver Assist", and a content item version criterion 518 of "at least 1.2". The criteria specified by the second record may be satisfied by the Autonom driver assistance version 1.3 content item 108F if the content item 108F is associated with a content item property having name="VIN" and value between X and Y.

At update policy 506 may be specified for each distribution unit to indicate whether content items that satisfy the criteria for the distribution unit are to be installed automatically, e.g., without requesting approval from a user or operator of the vehicle or distribution unit, or in response to receiving such approval.

FIG. 6 depicts a diagram illustrating a distribution unit lookup table 600, in accordance with one or more aspects of the present disclosure. The distribution unit lookup table 600 may be stored at a MDS 112, for example. The distribution unit lookup table 600 may be used by the MDS 112 to store the most recent version number of each content item that has been delivered to each distribution unit. The MDS 112 may use the distribution unit lookup table 600 to avoid re-sending content item versions that have already been sent to particular distribution units. The MDS 112 may also use the distribution unit lookup table 600 to identify the network address, public key, and installed distribution unit software version of each distribution unit. Each row of the distribution unit lookup table 600 represents a record that includes a distribution unit identifier 602, a delivered content item identifier 604, one or more delivered content item versions 606, a distribution unit network address 608, a distribution unit public key 610, and an installed distribution unit software version 612. The example distribution unit lookup table 600 includes a first row having a distribution unit identifier of "DU-A" (Owner's Garage), a delivered content identifier of "AMP-1001", a delivered content item version of 1.5, a distribution unit network address of "du-a.domain", and an installed distribution unit software version of 1.1. The example distribution unit lookup table 600 includes a second row having a distribution unit identifier of "DU-B" (Service Station), a delivered content identifier of "Elec-1001", a delivered content item version of 1.5, a distribution unit network address of "du-b.domain", and an installed distribution unit software version of 1.2.

FIG. 7 depicts a diagram illustrating a vehicle information lookup table 700, in accordance with one or more aspects of the present disclosure. The vehicle information lookup table 700 may be stored at a MDS 112 and/or one or more distribution units 130, for example. The vehicle information lookup table 700 may be generated by the MDS 112 from information received from distribution units 130. The MDS 112 may use the vehicle information lookup table 700 to identify the particular versions of content items that are installed on a particular vehicle. The MDS may then use the information about the particular versions of content items installed on the particular vehicle to determine whether a particular content item version is consistent with (e.g., compatible with) with the other content item versions installed on the particular vehicle. Each row of the vehicle information lookup table 700 associates a distribution unit identifier 704 with one or more vehicle properties 702. The vehicle properties include a vehicle manufacturer and model 706, a vehicle model year 708, a vehicle VIN 710, one or more ECU types 712, and one or more ECU content item versions 714. Each content item version 714 identifies a content item version of a corresponding one of the ECU types 712. For example, the first row of the vehicle information lookup table 700 associates the distribution unit identifier "DU-A" (Owner's Garage) with the vehicle "AMP Motors Model 965", the vehicle model year 2020, the vehicle VIN "X", and four content items: an Engine Control ECU content item having version 3.3, a battery management ECU content item having version 1.2, a navigation ECU content item having version 2.5, and a driver assist ECU content item having version 1.3.

The second row of the vehicle information lookup table 700 associates the distribution unit identifier "DU-A" (Owner's Garage) with the vehicle "AMP Motors Model 965", the vehicle model year 2021, the vehicle VIN "Y", and one content item: an Engine Control ECU content item having version 1.2.

The third row of the vehicle information lookup table 700 associates the distribution unit identifier "DU-B" (Service Station) with the vehicle "ICE Motors Model 300", the vehicle model year 2020, the vehicle VIN "Z", and three content items: an Engine Control ECU content item having version 1.0, a speed control ECU content item having version 1.1, and a navigation ECU content item having version 2.5.

FIG. 8 depicts a diagram illustrating a pending content request table 800, in accordance with one or more aspects of the present disclosure. Pending content request tables 800 may be stored distribution units 130, MDSs 112, or both. A distribution unit 800 or MDS 112 may use the pending content request table 800 to store state information about requests that are in progress, so that in-progress requests that are interrupted can be resumed. Each row of the pending content request table 800 associates a distribution unit identifier 802 with a vehicle identifier 804, a requested content item ID 806, and a request state 808. The vehicle identifier 804, requested content item ID 806, and request state 808 can be used to resume an interrupted download of a content item identified by the content item ID 808 to a vehicle identified by the vehicle identifier 804 via the distribution unit identified by the distribution unit identifier 802. The interrupted download can resume from the interrupted point identified by the request state, e.g., at a file position in the content item specified by the request state 808. The pending content request table 800 includes three rows, each of which identifies a pending content request (e.g., a content request for which a response has been partially sent). The first row of the pending content request table 800 represents a pending request associated with distribution unit "DU-A" for the vehicle "AMP Motors Model 985, VIN X" of the content item "AMP Motors EngineControl v3.3" for which 32,835 bytes have been transferred to the distribution unit 130 (e.g., from the MDS 112) and/or vehicle (e.g., from the distribution unit 130).

The second row of the pending content request table 800 represents a pending request associated with distribution unit "DU-A" for the vehicle "AMP Motors Model 985, VIN Y" of the content item "ElecTech Nav v2.5" for which 523,331 bytes have been transferred to the distribution unit 130 (e.g., from the MDS 112) and/or vehicle (e.g., from the distribution unit 130).

The third row of the pending content request table 800 represents a pending request associated with distribution unit "DU-B" for the vehicle "ICE Motors Model 300, VIN Z" of the content item "ICE Motors SpeedControl v1.1" for which 0 bytes have been transferred to the distribution unit 130 (e.g., from the MDS 112) and/or vehicle (e.g., from the distribution unit 130).

FIG. 9A depicts a diagram illustrating a distribution ECU lookup table 900, in accordance with one or more aspects of the present disclosure. The distribution ECU lookup table 900 may be stored at a distribution unit 130, such as "DU-A" (Owner's Garage) 130H of FIG. 1B, and may include records that represent the distribution ECUs 140 of one or more vehicles 142 associated with the distribution unit 130H. Each row of the distribution ECU lookup table 900 represents a distribution ECU and includes a distribution ECU identifier 902, a distribution ECU vehicle identifier 904 identifying a vehicle that contains the distribution ECU, a distribution ECU network address 906 of the distribution ECUC, and a distribution ECU public key 908 of the distribution ECU. A first row of the distribution ECU lookup table 900 represents a distribution ECU having identifier "DE-1" in a vehicle "AMP Motors Model 965, VIN X" and having ECU network address "de-1.domain." A second row of the distribution ECU lookup table 900 represents a distribution ECU having identifier "DE-3" in a vehicle "AMP Motors Model 965, VIN Y" and having ECU network address "de-3.domain."

FIG. 9B depicts a diagram illustrating a distribution ECU lookup table 910, in accordance with one or more aspects of the present disclosure. The distribution ECU lookup table 910 may be stored at a distribution unit 130, such as "DU-B" (Service Station) 130J of FIG. 1B, and may include records that represent the distribution ECUs 140 of one or more vehicles 142 associated with the distribution unit 130J. Thus, distribution ECU lookup table 910 is similar to distribution ECU lookup table 900, but is stored at distribution unit "DU-B" (Service Station) instead of "DU-A" (Owner's Garage). The row of the distribution ECU lookup table 910 represents a distribution ECU having identifier "DE-2" in a vehicle "ICE Motors Model 300, VIN Z" and having ECU network address "de-2.domain."

Figure 10:
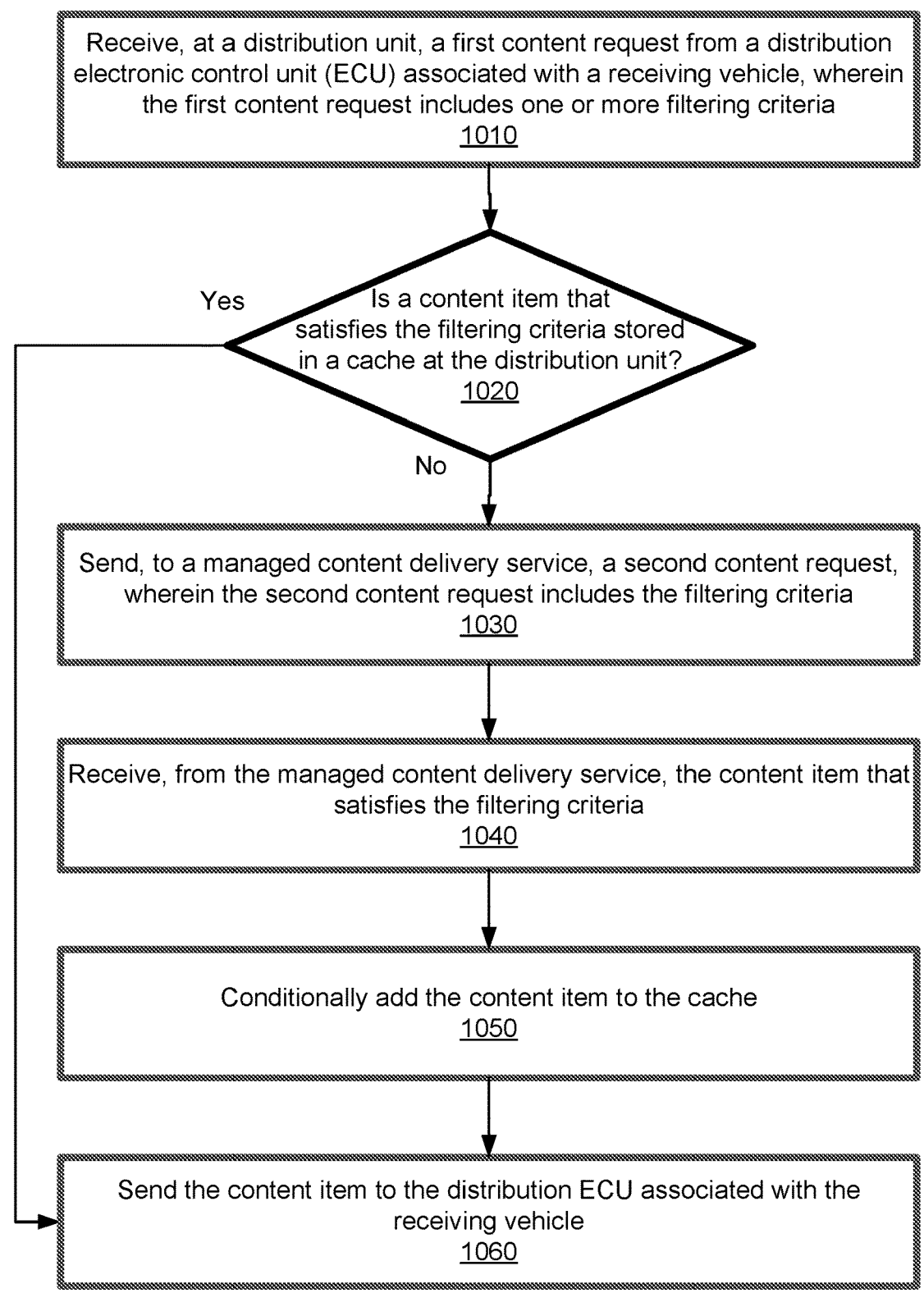
FIG. 10 depicts a flow diagram of an example method for processing a request for a content item at a distribution unit and sending the content item to a distribution ECU, in accordance with one or more aspects of the present disclosure.

FIG. 10 depicts a flow diagram of an example method 1000 for processing a request for a content item at a distribution unit and sending the content item to a distribution ECU, in accordance with one or more aspects of the present disclosure. Method 1000 and each of its individual functions, routines, subroutines, or operations may be performed by one or more processors of the computer device executing the method. In certain implementations, method 1000 may be performed by a single processing thread. Alternatively, method 1000 may be performed by two or more processing threads, each thread executing one or more individual functions, routines, subroutines, or operations of the method. In an illustrative example, the processing threads implementing method 1000 may be synchronized (e.g., using semaphores, critical sections, and/or other thread synchronization mechanisms). Alternatively, the processes implementing method 1000 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 1000 may be performed by a distribution unit 130 as shown in FIG. 1A, or by an executable code of a host machine (e.g., host operating system or firmware), a virtual machine (e.g., guest operating system or virtual firmware), an external device (e.g., a PCI device), other executable code, or a combination thereof.

Method 1000 may begin at operation 1010. At operation 1010, a processing device may receive, at a distribution unit 130, a first content request 262 from a distribution electronic control unit (ECU) 140 associated with a receiving vehicle. The first content request may include one or more filtering criteria.

At operation 1020, the processing device may determine whether a content item that satisfies the filtering criteria is stored in a cache at the distribution unit. If a content item that satisfies the filtering criteria is not stored in the cache at the distribution unit, then operation 1020 causes the processing device to perform operation 1030. Otherwise, operation 1020 causes the processing device to perform operation 1060.

At operation 1020, the processing device may determine whether the content item that satisfies the filtering criteria is stored in the cache the distribution unit may by searching a content cache index for the content item that satisfies the content request, as described below with reference to FIGS. 12 and 15. The content cache index (e.g., table 1222 of FIG. 15) may include one or more records, and each record may include a content item identifier and one or more content item properties. The content item that satisfies the request is associated with one or more particular content item properties that correspond to one or more requested content properties specified by the filtering criteria.

For example, the content item that satisfies the filtering criteria may correspond to a content item version identifier specified by the filtering criteria. As another example, the content item that satisfies the content request may correspond to an updated version of a content item associated with a receiving ECU of the receiving vehicle, where the receiving ECU of the receiving vehicle is identified by the filtering criteria. The filtering criteria may include one or more requested content properties, each of the requested content properties including one or more vehicle properties characterizing the receiving vehicle, or a content item version. The content item that satisfies the filtering criteria may be associated with one or more content item properties, and each of the requested content properties may correspond to (e.g., match) one of the content item properties associated with the content item.

The vehicle properties characterizing the receiving vehicle may be one or more of: a manufacturer of the receiving vehicle, a model identifier of the receiving vehicle, a year of the receiving vehicle, a vehicle identification number (VIN) of the receiving vehicle, one or more ECU type identifiers, each identifying an ECU of the vehicle, one or more ECU version identifiers, each identifying a version of an ECU of the vehicle, or one or more ECU content item version identifiers, each identifying a version of a content item installed in an ECU of the vehicle.

At operation 1030, the processing device may send, to a MDS, a second content request, wherein the second content request includes the filtering criteria. Sending, to the MDS, the second request may involve storing, in a pending content request table, a record including an identifier associated with the content item, an identifier associated with the distribution unit, an identifier associated with the receiving vehicle, and a request state, where the request state indicates an amount of progress of a download of the content item.

At subsequent operations, the processing device may, responsive to sending the content item to the distribution ECU associated with the vehicle, remove the record from the pending content request table.

At operation 1040, the processing device may receive, from the MDS, the content item that satisfies the filtering criteria. The processing device may store the received content item in the cache, as described below with respect to FIG. 12. At operation 1050, the processing device may conditionally add the content item to the cache. To perform operation 1050, the processing device may perform operations of method 1600 that update a content cache 1220, as described below with respect to FIG. 16. At operation 1060, the processing device may send the content item that satisfies the filtering criteria to the distribution ECU associated with the receiving vehicle.

At subsequent operations, the processing device may, responsive to receiving, at the distribution unit, the first content request, determine whether a download of the content item to the distribution ECU has been interrupted. Responsive to determining that the download of the content item has been interrupted, the processing device may resume the download of the content item in view of download state associated with the content item. Determining whether the download of the content item to the distribution ECU has been interrupted may involve searching a pending content request table for a record that includes an identifier of the content item and an identifier of the distribution ECU, where the record further includes the download state.

The request may be a request to subscribe to delivery of content items that satisfy the filtering criteria, and at subsequent operations, the processor may, responsive to receiving a notification from the MDS that another content item satisfying the filtering criteria is available, send, to the MDS, a third content request, wherein the third content request identifies the another content item. The processor may further receive, from the MDS, the other content item, and send the other content item to the distribution ECU associated with the receiving vehicle.

The content item may be further identified from one or more content items that are installed on the receiving vehicle, and the content item and the one or more content items that are installed on the receiving vehicle may form a consistent set of content items for the receiving vehicle. The content items installed on the receiving vehicle may be specified by the content request.

At subsequent operations, the processing device may send, to the MDS, a request for a list of content items installed on the receiving vehicle, and receive, from the MDS, the list of content items installed on the vehicle and further receive, for each content item installed on the receiving vehicle, a corresponding content version identifier specifying which version of the content item is installed on the receiving vehicle.

Receiving at the distribution unit, the first content request may involve receiving, from the distribution ECU, a message authentication code of the first content request, and verifying, using a public key associated with the distribution ECU, the message authentication code of the first content request.

Sending, to the MDS, the second content request may involve generating, using a private key associated with the distribution unit, a message authentication code of the second content request, and sending, to the MDS, the message authentication code of the second content request.

At subsequent operations, the processing device may send, to the MDS, a request for a predicted duration associated with the identified content item. The processing device may receive, from the MDS, the predicted duration. The processing device may update the predicted duration in view of a bandwidth between the distribution unit and the distribution ECU. The processing device may send to the distribution ECU, the predicted duration. The processing device may receive, from the distribution ECU, a confirmation of the content request.

FIG. 11 depicts a flow diagram of an example method 1100 for sending a content item to a distribution unit, in accordance with one or more aspects of the present disclosure. Method 1100 and each of its individual functions, routines, subroutines, or operations may be performed by one or more processors of the computer device executing the method. In certain implementations, method 1100 may be performed by a single processing thread. Alternatively, method 1100 may be performed by two or more processing threads, each thread executing one or more individual functions, routines, subroutines, or operations of the method. In an illustrative example, the processing threads implementing method 1100 may be synchronized (e.g., using semaphores, critical sections, and/or other thread synchronization mechanisms). Alternatively, the processes implementing method 1100 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 1100 may be performed by a MDS 112 as shown in FIG. 1A, or by an executable code of a host machine (e.g., host operating system or firmware), a virtual machine (e.g., guest operating system or virtual firmware), an external device (e.g., a PCI device), other executable code, or a combination thereof.

Method 1100 may begin at operation 1110. At operation 1110, a processing device may receive, at a MDS, a content item from a content provider system, where the content item is associated with one or more received content item properties. At operation 1110, the processing device may also conditionally add the received content item to a cache at the MDS using operations similar to those described below with respect to FIG. 16. At operation 1120, the processing device may identify a distribution unit, where the identified distribution unit is associated with one or more filtering criteria, and the received content item properties satisfy the filtering criteria. The processing device may identify the distribution unit by, for example, searching a content subscription table 500 of FIG. 5 for a record having filtering criteria that match the content item properties of the received content item. The subscribing distribution nit 504 of a matching record corresponds to the identified distribution unit. For example, if the received content item properties include "Software provider=AMP Motors" and "vehicle model year(s)= "2020", then the matching distribution unit is DU-A (Owner's Garage) according to the first record of example content subscription table 500, which has filtering criteria of "software provider=AMP Motors" and "vehicle model year(s) =At least 2018."

The filtering criteria may include one or more criteria properties, e.g., "Software Provider=AMP Motors", and the criteria properties may include one or more vehicle properties, e.g., "vehicle model year(s)=At least 2018" or a content item version, e.g., "at least 1.2" or "*" for any version, as shown in the example content subscription table 500. The received content item properties may satisfy the filtering criteria responsive to each of the criteria properties corresponding to one of the received content item properties.

Each of the received content item properties may include one or more of: a content item provider identifier, one or more vehicle properties, a content item version, or a content item size. The vehicle properties may include one or more of a manufacturer of the receiving vehicle, a model identifier of the receiving vehicle, a year of the receiving vehicle, a vehicle identification number (VIN) of the receiving vehicle, one or more ECU type identifiers, each identifying an ECU of the vehicle, one or more ECU version identifiers, each identifying a version of an ECU of the vehicle, or one or more ECU content item version identifiers, each identifying a version of a content item installed in an ECU of the vehicle.

At operation 1130, the processing device may identify, using the distribution unit's identity, a receiving vehicle. To identify the receiving vehicle, the processing device may identify, in a vehicle information lookup table 700, a record that associates the distribution unit with one or more vehicle properties that correspond to the received content item properties, where at least one of the vehicle properties of the identified record identifies the receiving vehicle.

At operation 1140, the processing device may identify, using the receiving vehicle's identity, one or more first content items that are installed on the receiving vehicle. The first content item(s) installed on the receiving vehicle may be identified by the vehicle lookup table record that associates the distribution unit with the vehicle properties that correspond to the received content item properties.

At operation 1150, the processing device may determine whether the received content item and the one or more first content items form a consistent set of content items for the receiving vehicle. To determine whether the received content item and the one or more first content items form a consistent set of content items for the receiving vehicle, the processing device may identify, in the one or more first content items, one or more dependent content items, where the received content item depends on the one or more dependent content items. The processing device may determine, according to content item compatibility information, whether the first content item is compatible with each of the dependent content items, where the received content item and the one or more first content items form a consistent set responsive to the first content item being compatible with each of the dependent content items.

The received content item may depend on the one or more dependent content items if the received content item references at least one of the dependent content items. For example, the received content item may reference at least one symbol in each of the dependent content items. In another example, the received content item may reference a shared library that corresponds to the dependent content item.

Each of the dependent content items may be associated with a dependent content item version, the first content item is associated with a first content item version, and the first content item is compatible with each of the dependent content items if the first content item version is compatible with each of the dependent content item versions according to content item compatibility information.

The processing device may store, in the available content table, one or more records, each record associating the one of the received content items with the one or more content item properties of the one of the received content items. The processing device may further store each of the received content items in the data store associated with the MDS.

The processing device may store, in an available content table, a record associating the received content item with the one or more content item properties. The processing device may further store the received content item in a data store associated with the MDS.

At operation 1160, the processing device may, responsive to determining that the received content item and the one or more first content items form a consistent set of content items for the receiving vehicle, send the content item to the identified distribution unit.

At subsequent operations, the processing device may, the processing device may receive, at the MDS, a content request from a distribution unit, wherein the content request comprises one or more filtering criteria. The processing device may determine whether a content item that satisfies the filtering criteria is stored in a storage device associated with the MDS. Responsive to determining that the content item that satisfies the filtering criteria is stored in the storage device associated with the MDS, the processing device may send the content item to the distribution unit.

Responsive to determining that the content item that satisfies the filtering criteria is not stored in the storage device associated with the MDS, the processing device may send, to one or more content provider systems, a request for the content item that satisfies the filtering criteria. The processing device may receive, from at least one of the content provider systems, the content item that satisfies the filtering criteria. The processing device may send the content item to the distribution unit.

Figure 12:
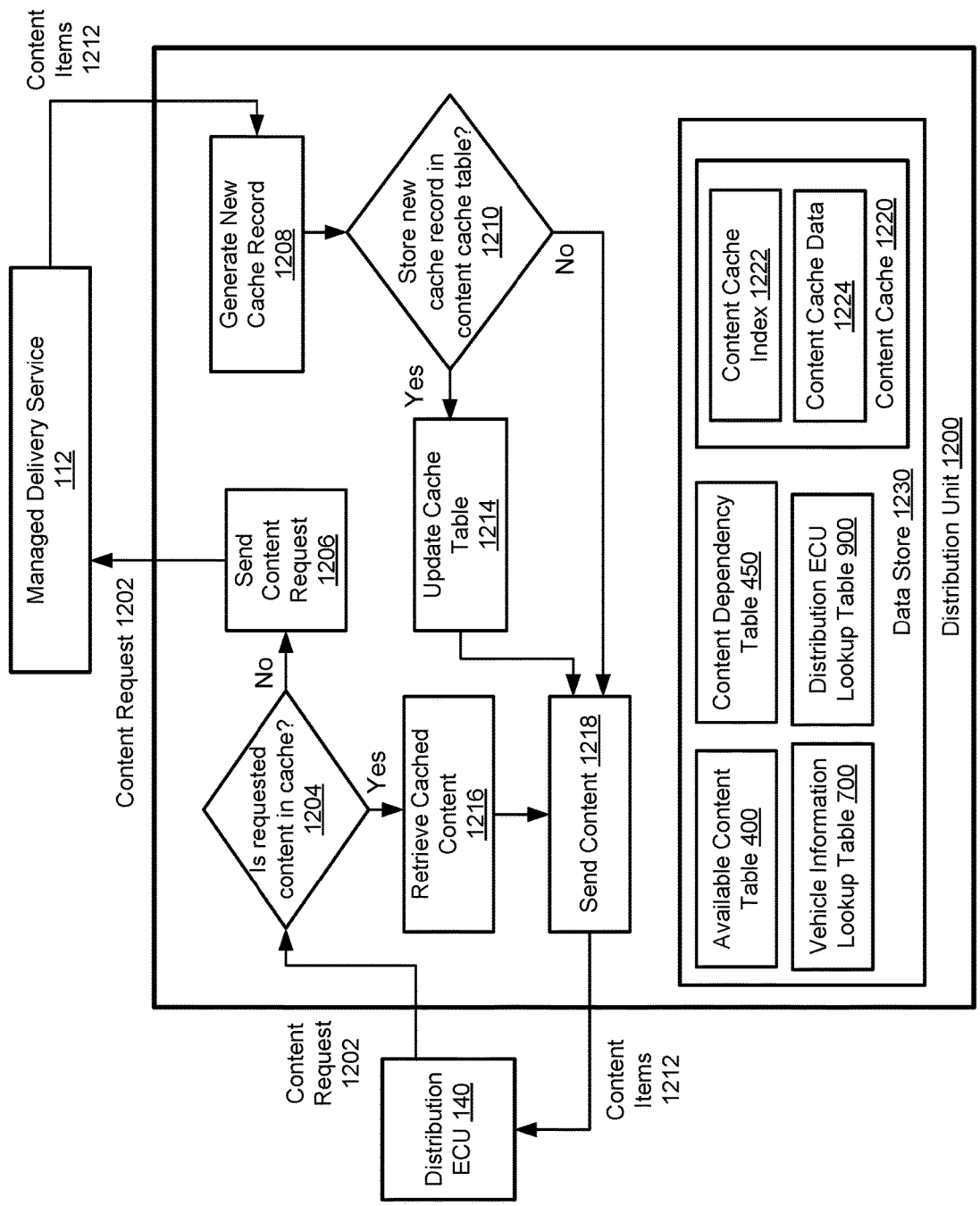
FIG. 12 depicts a high-level block diagram of a distribution unit that includes a content cache, in accordance with one or more aspects of the present disclosure.

FIG. 12 depicts a high-level block diagram of a distribution unit 1200 that includes a content cache 1220, in accordance with one or more aspects of the present disclosure. The distribution unit 1200 may correspond to one or more of the distribution units 130 of FIGS. 1A and 1B, for example. The distribution unit 1200 includes a data store 1230, which can include one or more tables described herein, such as available content table 400, content dependency table 450, content subscription table 500, vehicle information lookup table 700, and distribution ECU lookup table 900. Data store 1230 can also include a cache index 1222, which stores records that represent cached content items. Each record in cache index 1222 includes a predicted content consumption frequency and content item properties. The content item properties can include a content data file name that identifies content cache data 1224 in the data store 1230. Example cache indexes are shown in FIGS. 15A and 15B.

The distribution ECU 140 can send a content request 1202 to the distribution unit 1200. The content request can specify one or more content item properties, such as a content item identifier, a content provider, a vehicle manufacturer, a vehicle model year, an ECU type (e.g., engine control, Nav, and so on), an ECU hardware version, a content item version, and/or a content item size. At operation 1204, the distribution unit 1200 determines whether the requested content item specified by the content request 1202 is in the cache by, for example, querying a content cache index 1222 for a record having a content item that matches the content request 1202. For example, at operation 1204, distribution unit 1200 may identify a content identifier that satisfies the content request and query the content cache index 1222 for a record having the content identifier. The distribution unit 1200 may extract the content identifier from the content request 1202, if present, or perform a content item lookup operation to identify a content item having one or more content item properties specified in the content request 1202. As another example, at operation 1204, the distribution unit 1200 may query the content cache index 1222 for a record having content item properties that match the content item properties specified in the content request 1202. If the content cache index 1222 contains a record having a content item that matches the content request 1202, then operation 1204 determines that the requested content is in the cache, and performs operation 1216. Otherwise, operation 1204 determines that the requested content is not in the cache, and performs operation 1206.

At operation 1216, the distribution unit 1200 retrieves the identified content item from the cache. For example, the distribution unit 1200 may retrieve content cache data 1224 of the content item from a file identified by a content data file name specified by one of the content items of the retrieved record. The content cache data 1224 can be, for example, software that can run on electronic control units (ECUs) of vehicles. The software can be, e.g., program code and data. The distribution unit may also retrieve one or more content item properties, such as a content item seize, from the retrieved record. At operation 1214, the distribution unit 1200 sends the retrieved content item, including the content item properties and content cache data 1224, to the distribution ECU 140 as content items 1218.

At operation 1206, which the distribution unit 1200 performs if the requested content is not in the cache, the distribution unit 1200 sends the content request 1202 to the MDS 112. The MDS 112 sends a content item 1212 in response to the request, and the distribution unit 1200 receives the content item 1212 at operation 1208. Operation 1208 generates a new cache record that includes a predicted content consumption frequency ("predicted consumption frequency") and a received content item 1212. At operation 1210, the distribution unit 1200 determines whether to store the new cache record in the content cache index 1222. Operation 1210 can, for example, compare the predicted consumption frequency to a consumption frequency associated with each of the records in the content cache index 1222. If operation 1210 identifies a record having a lower consumption frequency than the predicted consumption frequency, or the content cache index 1222 is not full (e.g., there is available capacity in the cache to store the new cache record without evicting any existing records), then operation 1210 determines that the new cache record is to be stored in the content cache index 1222, and invokes operation 1214. Otherwise, operation 1210 determines that the new cache record is not to be stored in the content cache index 1222, and invokes operation 1214, which sends the content item 1212 to the distribution ECU 140.

At operation 1214, the distribution unit 1200 updates the cache index 1222 to include the new cache record. If the cache is full (e.g., the number of records in the cache index 1222 exceeds a threshold number, or the total size of the content items listed in the cache index 1222 exceeds a threshold size), then operation 1214 identifies, in the cache index 1222, a record having the lowest predicted content consumption frequency, and removes the identified record from the cache index 1222. Operation 1214 also stores the new cache record in the cache index 1222. The distribution unit 1200 then performs operation 1218, which sends the content items 1212 to the distribution ECU 140.

Although particular operations are described as being performed by particular components of distribution unit 1200, the particular operations may be performed by any suitable components of distribution unit 1200.

Figure 13:
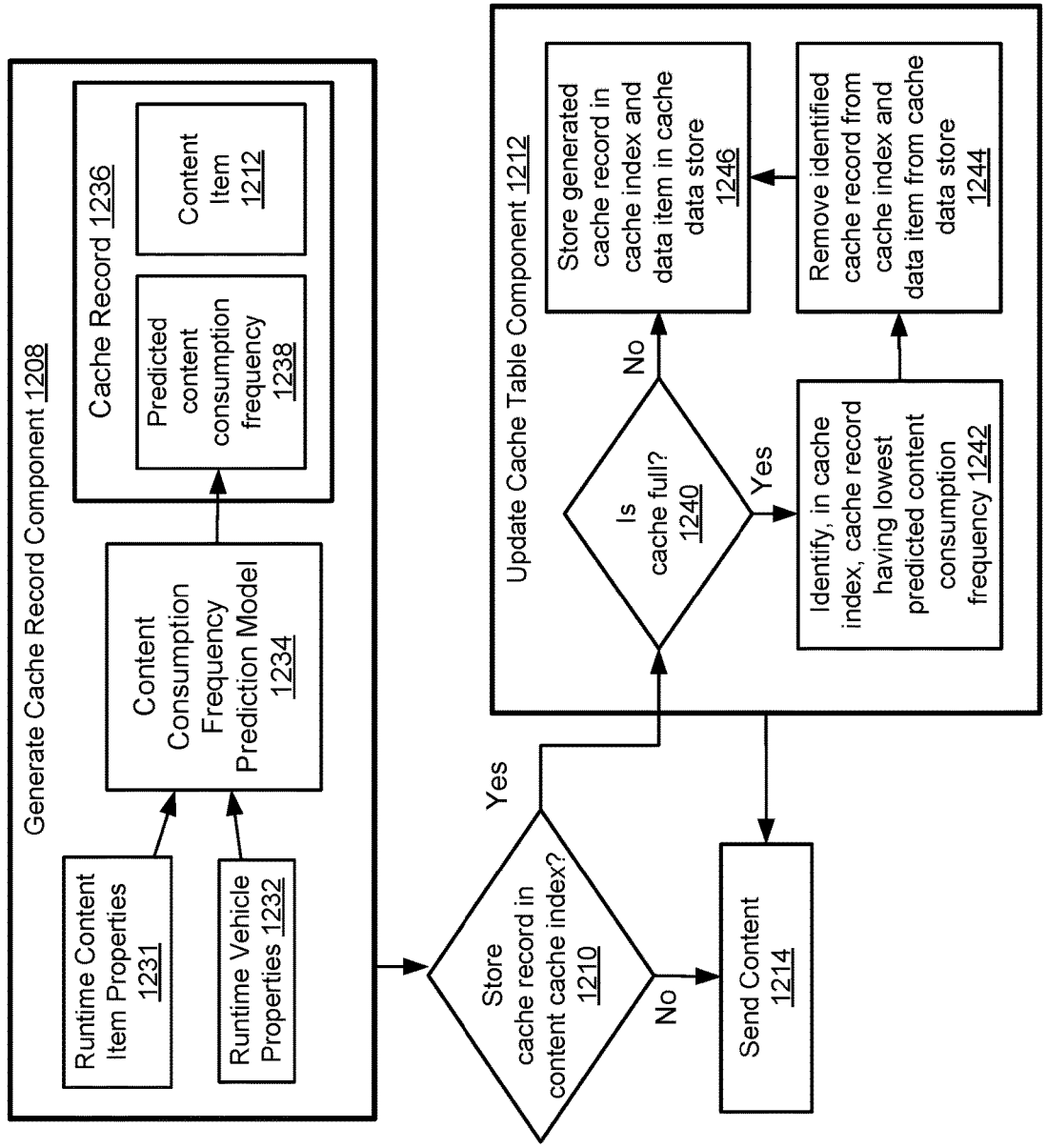
FIG. 13 depicts a high-level block diagram of cache-related components of a distribution unit, in accordance with one or more aspects of the present disclosure.

FIG. 13 depicts a high-level block diagram of cache-related components of a distribution unit 1200, in accordance with one or more aspects of the present disclosure. FIG. 13 shows further details of the Generate Cache Record Component 1208, which generates cache records, and the Update Cache Index Component 1214, which stores cache records in the cache index 1222. The Generate Cache Record Component 1208 includes a content consumption frequency prediction model 1234, which maps a received content item 1212 and one or more vehicle properties 1232 to a predicted content consumption frequency 1238. The received content item 1212 may include or be associated with content item properties 280 and/or content data 290. The content item properties 280 may include a file name, for example, that identifies a file in which content data 290 is stored.

The distribution unit 130 can store the predicted consumption frequency 1238 in a generated cache record 1236 along with the content item 1212. As described above with respect to FIG. 12, operation 1210 determines whether to store the cache record 1236 in the content cache index 1222. If at operation 1210 the distribution unit 1200 determines that the cache record 1236 is to be stored in the content cache index 1222, then the content cache index 1222 performs the operations shown in the Update Cache Index Component 1214 as follows. Operation 1240 determines whether the cache is full. If so, operation 1242 identifies, in the cache index 1222, a cache record having the lowest predicted content consumption frequency. Operation 1244 removes the identified cache record from the cache index 1222. Operation 1244 may also remove the content cache data 1224 from the content cache 1220, e.g., by deleting a file identified by the identified cache record. Operation 1246 stores the generated cache record 1236 in the cache index 1222. Operation 1246 can also store content data 290 of the content item 1212 in content cache data 1224, e.g., in a file. Operation 1246 can include a file name of the file in the generated cache record 1236 stored in the cache index 1222.

If operation 1240 determines that the cache is not full, then operation 1246 stores the generated cache record 1236 in the cache index 1222 without removing any cache records from the cache index 1222. The distribution unit 1200 then performs operation 1214 to send the content item 1212 to the distribution ECU 140.

FIG. 14A depicts a high-level block diagram of a training environment for a content consumption frequency prediction model ("model") 1234, in accordance with one or more aspects of the present disclosure. The model 1234 can be any suitable machine learning model or heuristic model, such as a Linear Regression, Bayes, Random Forest, Support Vector Classifier, Decision Tree, Gradient Boosted Tree, K-Nearest Neighbors model, or the like. The model 1234 can be implemented by one or more neural networks. The model 1234 can be trained by a model training component 1410, which receives training data 1400 and generates the model 1234 based on the training data 1400. The training data includes a plurality of records, and each record includes a content consumption feature set 1402 and a respective training value of a frequency of content consumption 1408. The vehicle update feature set includes features, e.g., data values that are provided to the model training component 1410 as input. The content consumption feature set 1402 includes one or more training content item properties 1404 of a content item that was consumed (e.g., a content item that was accessed on a vehicle, and one or more vehicle properties 1406 of the vehicle on which the content item was accessed. The training data 1400 may be for a particular distribution unit, e.g., generated from consumption performed on a particular distribution unit, in which case the model 1234 trained on the data 1400 should be used by the particular distribution unit. Alternatively or additionally, a distribution unit identifier may be included in each record of the training data, in which case the model 1234 trained on the data 1400 may be used by any of the distribution units identified in the training data. In other examples, the model 1234 may be used by any distribution unit, regardless of whether the model 1234 was trained based on training data 1400 generated at the distribution unit.

The training content item properties 1404 may include one or more properties of a content item itself, and one or more properties of vehicles that are compatible with the content item. The training content item properties 1404 may include, for example, one or more of a content item identifier 402, a content provider 404, a vehicle manufacturer and/or model 406 with which the content item is compatible, a vehicle model year 408 (which may be a range of years) with which the content item is compatible, an ECU type 410 with which the content item identified by the training content item properties 1404 is compatible, an ECU hardware version 412 with which the content item is compatible, a content item version 414, or a content item size 416.

The training vehicle properties 1406 may include one or more properties of a vehicle on which a content item corresponding to the content item properties 1404 was consumed, for example. The vehicle properties may include one or more of a vehicle manufacturer 406, model year 408, ECU type 410, or ECU hardware version 412). The training frequency value of content consumption 1408 may be based on a time at which the content item was consumed on a vehicle and one or more other times at which the content item was consumed (e.g., on the same vehicle or other vehicles). The training vehicle properties 1406 can be empty (e.g., not specified), in which case the model 1234 is trained on the content item properties 1404 and does not use vehicle properties to generate predictions.

The frequency of content consumption 1408 may be determined (e.g., measured) by timing the intervals between consecutive content consumptions (e.g., accesses) for a vehicle having the vehicle properties 1406 and for content items having the content item properties 1404, or by other suitable techniques. For example, the frequency of content consumption 1408 may alternatively or additionally be determined by dividing the total number of content consumptions in a time period by the length of the time period. The model training component 1410 may provide each record of the training data 1400 to the model 1234 in a training mode in which weights or other parameters of the model 1234 may be determined. The training component 1410 may, for example determine values of the weights or other parameters of the model 1234 that minimize an error metric reflecting the difference between a predicted frequency generated by the model for a record of training data, and the training value of the frequency 1408 supplied for the training data item by the respective record of training data 1400.

After being trained, the model 1234 can, as shown in FIG. 12, generate (e.g., infer) a predicted content consumption frequency 1238 for input that includes specified runtime content item properties 1231 and specified runtime vehicle properties 1232. The term "runtime" is used to distinguish the properties 1231, 1232, which are used at runtime, from the training properties 1404, 1406, which are used at training time (as shown in FIG. 14A and described above). The runtime content item properties 1404 identify a content item provided as input to the model 1234 at runtime.

The runtime content item properties 1231 may include, for example, one or more of a content item identifier 402, a content provider 404, a vehicle manufacturer and/or model 406 with which the content item is compatible, a vehicle model year 408 (which may be a range of years) with which the content item is compatible, an ECU type 410 with which the content item identified by the training content item properties 1410 is compatible, an ECU hardware version 412 with which the content item is compatible, a content item version 414, or a content item size 416.

The runtime vehicle properties 1232 may include, for example, a vehicle manufacturer 406, model year(s) 408, ECU type 410, and ECU hardware version 412). The vehicle properties 1232 may be properties of a vehicle on which the distribution unit 304 has permission to install updates and/or vehicle properties of any vehicle for which a predicted content consumption frequency 1238 is desired, e.g., a vehicle of a make and model that is expected to frequently be serviced at a service station 144J at which the distribution unit 130 is located. Vehicles that are expected to be frequently serviced may include vehicles that exist in relatively large numbers near the location of the service station 144J, for example. The runtime vehicle properties 1232 can be empty (e.g., not specified), in which case the model 1234 does not use the vehicle properties 1232 to generate predictions.

Subsequent to being trained by the model training component 1410, the model 1234 can be used to generate predicted content consumption frequencies 1238 from values of features that correspond to the features included in the content consumption feature set 1402. The features provided to the trained model 1234 can include content item properties of a content item 1230 and vehicle properties 1232 that are not necessarily included in the training data 1400.

FIG. 14B depicts a diagram illustrating training data 1420 for a machine learning model, in accordance with one or more aspects of the present disclosure. The training data 1420 may be provided to a model training component 1410 as input to train a model 1234, for example. The training data 1420 includes a content consumption feature set 1422 that is represented as a set of records, and a respective frequency of content consumption 1428 for each of the records. The content consumption feature set 1422 includes content item properties 1424 and vehicle properties 1426. The training data 1420 may be generated at described above with respect to FIG. 14A. For example, each record of the training data 1420 may be generated from multiple consumption operations, each of which installed a content item having the content item properties 1424 of the record to on a vehicle having vehicle properties 1426 of the record. The frequency of content consumption 1428 may be determined by dividing the number of times a consumption operation (e.g., content access) was performed on the content item identified by the record by the time between the earliest and most recent of the consumption operations. The frequency of content consumption 1428 may be calculated in any other suitable way, e.g., based on an average time interval between the consumption operations. In other embodiments, a consumption interval may be included in the training data and predicted by the model 1234 as an alternative to (or in addition to) the frequency of content consumption 1428.

In the vehicle content consumption feature set 1422, the content item properties 1424 include a content item identifier, a content provider name, a vehicle manufacturer and model range (e.g., Model 9XX represents any model number starting with the number 9), and an ECU type. The vehicle properties 1426 include a vehicle manufacturer and model, a vehicle identifier (which may be different from the vehicle's VIN for privacy reasons), and a vehicle model year. For example, the first record of the content consumption feature set 1422 includes the content item property values AMP-1001 for the content item identifier, AMP Motors for the content provider, AMP Motors Model 9XX for the vehicle manufacturer and model, Engine Control for the ECU type. The first record further includes vehicle property values AMP Motors Model 965 for the vehicle manufacturer and model, VID1 for the vehicle identifier, and 2021 for the vehicle model year. The first record also includes "3 per day" as the frequency of content consumption 1428. Although particular features and values are shown in the example training data 1420, the training data 1420 may include any suitable features and values in other examples. For example, the training data may include substantially more than four records. The model training component 1410 may generate a prediction model 1234 based on training data 1420 as described above with respect to FIG. 14A.

The prediction model 1234 may predict a frequency of content consumption for a specified content consumption feature set. For example, to the prediction model 1234 may be used to predict the frequency of content consumption for runtime content item properties 1231 having the values for AMP-1002 for the content item identifier, AMP Motors for the content provider, AMP Motors Model 9XX for the vehicle manufacturer and model, and Engine Control for the ECU type, and runtime vehicle properties 1232 having the values AMP Motors Model 965 for the vehicle manufacturer and model, and 2020 for the vehicle model year. The predicted content consumption frequency 1238 generated by the prediction model 1234 may be a value such as 2 consumptions per day, e.g., representing 2 accesses per day of the content item on vehicles having the content item properties 1231 and runtime vehicle properties 1232. The predicted content consumption frequency 1238 can be used to predict the time interval until the next consumption (e.g., access or use) of a content item by inverting the frequency value. For example, a frequency of 2 accesses per day corresponds to a consumption interval of ½ day. Thus, the next consumption of a content item (that has the content item properties provided to the model 1234) on a vehicle (having the vehicle properties provided to the model) is predicted to occur ½ day after the most recent consumption of such a content item on such a vehicle.

The prediction model 1234 can be used to identify a set of vehicles that are likely to request content from a distribution unit. For example, at a service station, the set of vehicles that are likely to request content can be identified by providing a data set that represents potential content requests of vehicles to the to the prediction model 1234 as input. The data set may include content item properties 1424 of content items that the service station has permission to install and further includes vehicle properties of vehicles compatible with the respective content items, or of vehicles that often visit the service station. The prediction model 1234 may predict the frequency at which each data item represented by the content item properties in the data set is likely to be consumed on a vehicle, or the frequency at which a data set is likely to be consumed on each vehicle represented by the vehicle properties in the data set.

FIG. 15A depicts a diagram illustrating a content cache index 1222A, in accordance with one or more aspects of the present disclosure. The content cache index 1222A may be stored at one or more distribution units 130, for example.

The content cache index 1222A may be generated by an Update Cache Table component 1214 of a distribution unit 130, for example. The content cache index 1222A includes a set of records represented by rows. Each record represents an entry in a content cache. Each record associates a content item identifier 1502 with a predicted frequency of content consumption and a set of content item properties that identify a content item. The content item properties include a consumption count 1506, which indicates the number of times the content item has been consumed (e.g., accessed or used) on a vehicle, a content item size 1508, which represents the size of the content item (e.g., in bytes), and a content data file name 1510, which identifies a location of the content item. The content item may be, for example, a file or directory containing program code, media files, or other content. The file or directory may be located on a storage device that is local to the distribution unit 130 associated with the content cache index 1244A. The content cache index 1244A includes four records, each representing a content item stored in the content cache. The four records are identified by the content item identifiers AMP-1001, AMP-1002, Elec-1001, and ICE-1001. The AMP-1001 record includes a predicted frequency "1 per day," a consumption count "14," a content item size "345,535 bytes," and a file name "Amp1001." The predicted frequencies of the AMP-1002, Elec-1001, and ICE-1001 records are 1.5 per day, 0.25 per day, and 0.1 per day, respectively.

FIG. 15B depicts a diagram illustrating a content cache index 1222B, in accordance with one or more aspects of the present disclosure. The content cache index 1244B is generated by the distribution unit 130 in response to downloading of a content item having identifier "Autonom-1001" that replaces one of the entries of content cache index 1244A, according to the operations described above with respect to FIGS. 12 and 13. In this example, content cache is full, e.g., because the sum of the content item sizes is greater than a threshold number of bytes. Since the content cache is full, the downloaded content item is added to the table 1244A if the predicted frequency of content consumption calculated for the downloaded content item is greater than the predicted frequency of content consumption of at least one of the records in the table 1244A (or, using a different criterion, if the predicted frequency of content consumption calculated for the downloaded content item is greater than the minimum value of the predicted frequency of content consumption column of table 1244A). In this example, the predicted frequency of content consumption calculated for the downloaded content item is 0.8 per day, which is greater than the 0.1 per day of ICE-1001 in table 1244A. Thus, the record corresponding to ICE-1001 is evicted from the cache by deleting the record from the table 1222A and deleting the file identified by the content data file name Ice1001 from the storage of the distribution unit 130. A record representing the downloaded content item is added to the table 1244B. The added record has content item identifier "Autonom-1001," predicted frequency "0.8 per day," consumption count "14," size "2,414,873 bytes," and file name "Autonom101." Although the records are shown in sorted order (by predicted frequency of content consumption), e.g., for efficient identification of the lowest predicted frequency of content consumption, the records need not be in sorted order in other examples.

Figure 16:
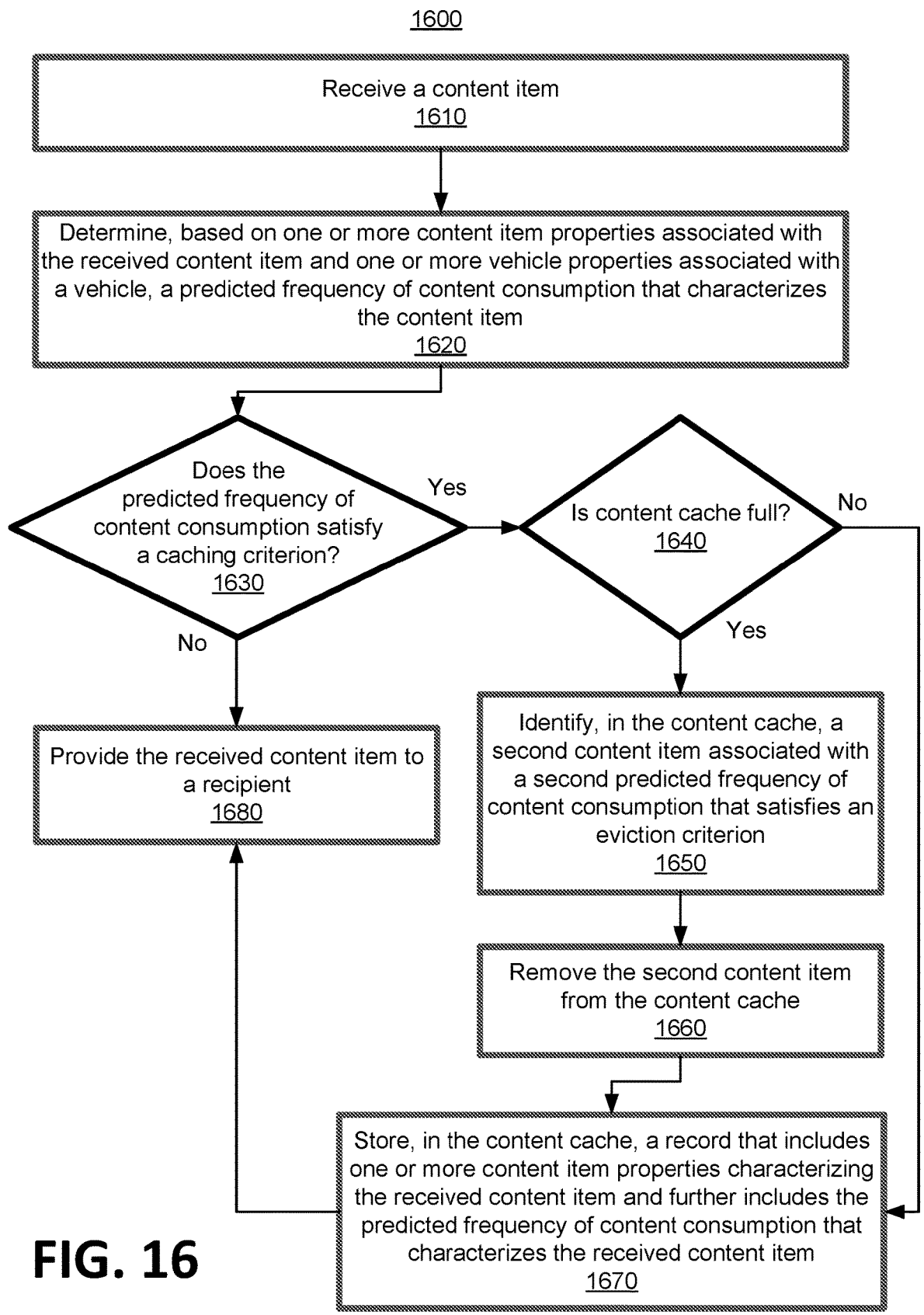
FIG. 16 depicts a flow diagram of an example method for conditionally adding a content item to a cache, in accordance with one or more aspects of the present disclosure.

FIG. 16 depicts a flow diagram of an example method 1600 for conditionally adding a content item to a cache, in accordance with one or more aspects of the present disclosure. Method 1600 and each of its individual functions, routines, subroutines, or operations may be performed by one or more processors of the computer device executing the method. In certain implementations, method 1600 may be performed by a single processing thread. Alternatively, method 1600 may be performed by two or more processing threads, each thread executing one or more individual functions, routines, subroutines, or operations of the method. In an illustrative example, the processing threads implementing method 1600 may be synchronized (e.g., using semaphores, critical sections, and/or other thread synchronization mechanisms). Alternatively, the processes implementing method 1600 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 1600 may be performed by a distribution unit 130 or MDS 112 as shown in FIG. 1A, or by an executable code of a host machine (e.g., host operating system or firmware), a virtual machine (e.g., guest operating system or virtual firmware), an external device (e.g., a PCI device), other executable code, or a combination thereof.

Method 1600 may begin at operation 1610. At operation 1610, a processing device may receive a content item, e.g., from an MDS 112 (e.g., if the method 1600 is performed by a distribution 130) or from a provider system 102 (e.g., if the method 1600 is performed by an MDS 112). At operation 1620, the processing device may At operation 1620, the processing device may determine, based on one or more content item properties associated with the received content item and one or more vehicle properties associated with a vehicle, a predicted frequency of content consumption that characterizes the content item.

At operation 1630, the processing device may determine whether the predicted frequency of content consumption satisfies a caching criterion. The caching criterion may be, for example, the caching criteria described above with respect to operation 336. Alternatively or additionally, the caching criterion may be satisfied by the predicted frequency of content consumption if, for example, the predicted frequency of content consumption is greater than a predicted frequency of content consumption of at least one content item that is included in the cache. If so, then at operation 1640, the processing device may determine whether the cache is full. The cache may be full if, for example, the number of records in the content cache index 1222 exceeds a threshold number, or the total size of the content items listed in the content cache index 1222 exceeds a threshold size. If the cache is full, then at operation 1650, the processing device may identify, in the content cache, a second content item associated with a second predicted frequency of content consumption that satisfies an eviction criterion.

At operation 1660, the processing device may remove the second content item from the content cache, e.g., by deleting a record representing the second content item from the content table 1222 and deleting a file identified by a content data file name associated with the record from the storage of the distribution unit 130.

At operation 1670, the processing device may store, in the content cache, a record that includes one or more content item properties characterizing the received content item and further includes the predicted frequency of content consumption that characterizes the received content item. At operation 1680, the processing device may provide the received content item to a recipient, e.g., by sending the received content item to a distribution ECU 140.

If at operation 1630 the processing device determines that the predicted frequency of content consumption does not satisfy the caching criterion, then at operation 1680 the processing device may provide the received content item to a recipient. If at operation 1640 the processing device determines that the cache is not full, then the processing device may perform operation 1670, which stores a record that includes the content item properties and the predicted frequency of content consumption of the received content item in the content cache, and perform operation 1680, which provides the received content item to a recipient.

Figure 17:
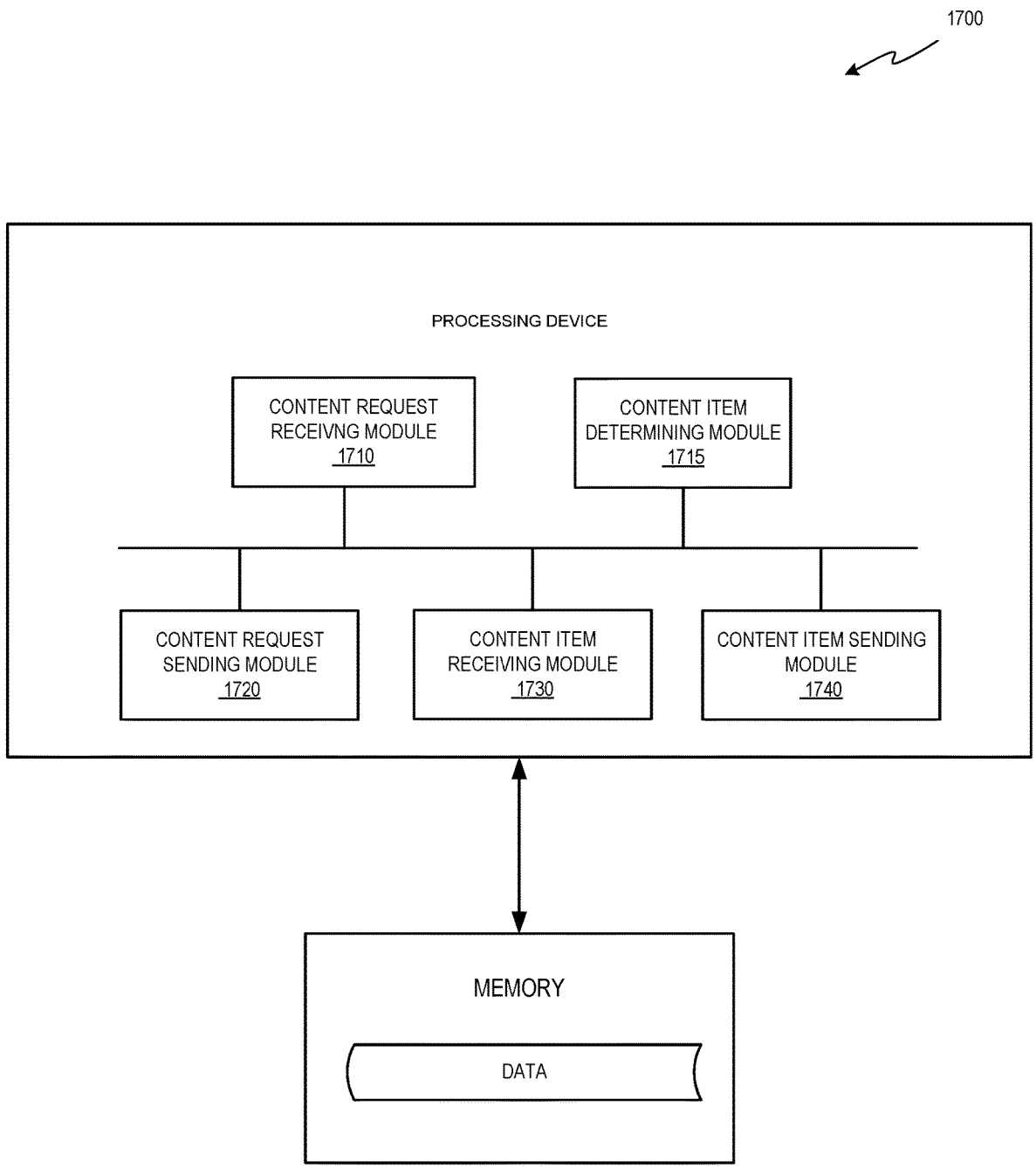
FIG. 17 depicts a block diagram of computer systems operating in accordance with one or more aspects of the present disclosure.

FIG. 17 depicts a block diagram of a computer system 1700 operating in accordance with one or more aspects of the present disclosure. Computer system 1700 may be the same or similar to distribution unit 130, MDS 112, or distribution ECU 140 of FIG. 1A, and may include one or more processors and one or more memory devices. In the example shown, computer system 1700 may include a content request receiving module 1710, a content item determining module 1715, a content request sending module 1720, a content item receiving module 1730, and a content item sending module 1740.

Content request receiving module 1710 may enable a processor to receive, at a distribution unit, a first content request from a distribution electronic control unit (ECU) associated with a receiving vehicle, wherein the first content request includes one or more filtering criteria. Content item determining module 1715 may enable a processor to determine whether a content item that satisfies the filtering criteria is stored on a storage device of the distribution unit. The content item that satisfies the filtering criteria may correspond to a content item version identifier specified by the filtering criteria. Content request sending module 1720 may enable a processor to, responsive to determining that the content item that satisfies the filtering criteria is not stored on the storage device of the distribution unit, send, to a MDS, a second content request, wherein the second content request includes the filtering criteria.

Content item receiving module 1730 may enable a processor to, responsive to determining that the content item that satisfies the filtering criteria is not stored on the storage device of the distribution unit, receive, from the MDS, the content item that satisfies the filtering criteria. Content item sending module 1740 may enable a processor to send the content item that satisfies the filtering criteria to the distribution ECU associated with the receiving vehicle.

Figure 18:
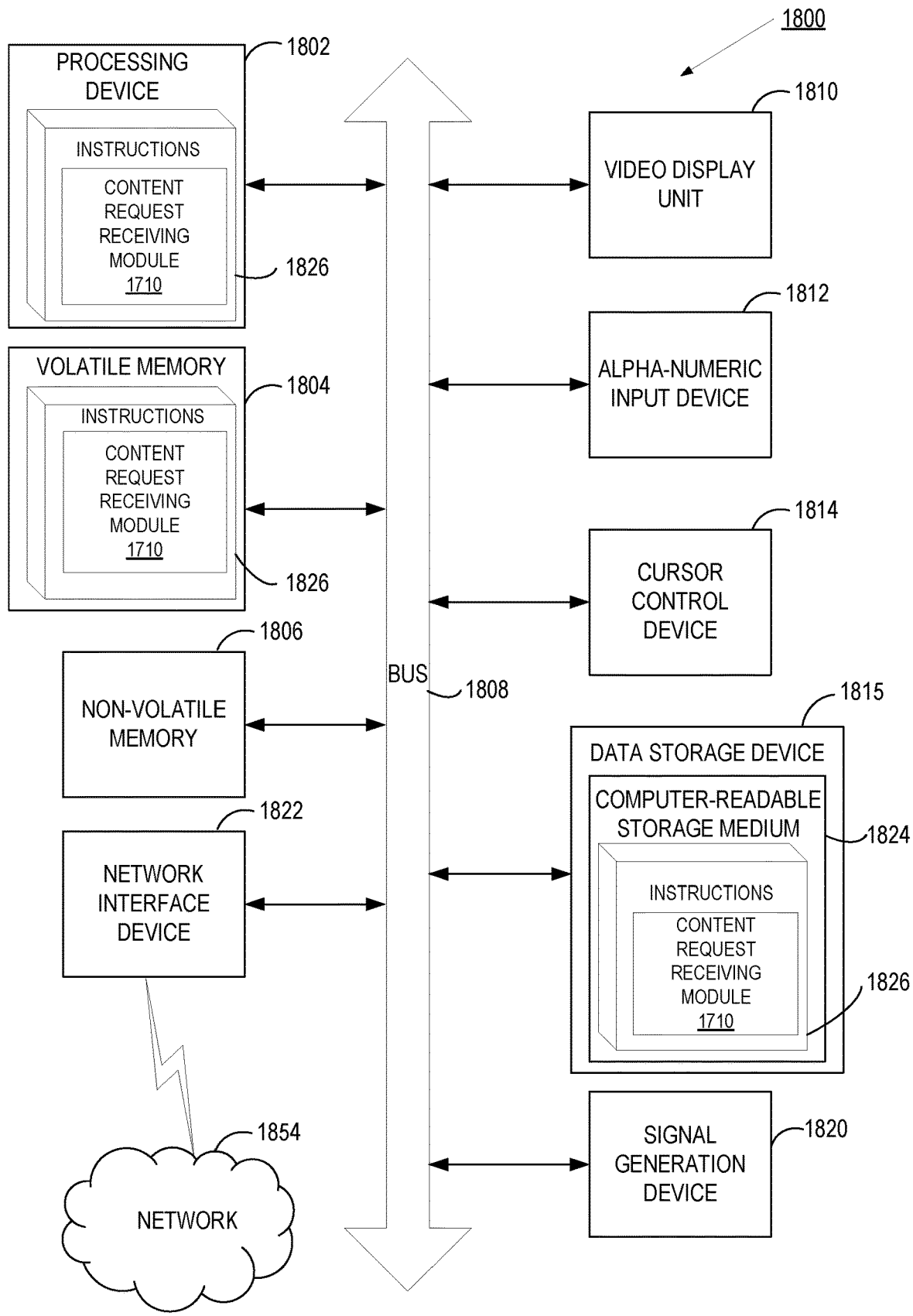
FIG. 18 depicts a block diagram of an example computer system operating in accordance with one or more aspects of the present disclosure.

FIG. 18 depicts a block diagram of a computer system operating in accordance with one or more aspects of the present disclosure. In various illustrative examples, computer system 1800 may correspond to distribution unit 130, MDS 112, or distribution ECU 140 of FIG. 1A. Computer system 1800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 1800 may be connected (e.g., via a network, such as a Local Area Network (LAN), an intranet, an extranet, or the Internet) to other computer systems. Computer system 1800 may operate in the capacity of a server or a client computer in a client-server environment, or as a peer computer in a peer-to-peer or distributed network environment. Computer system 1800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1800 may include a processing device 1802, a volatile memory 1804 (e.g., random access memory (RAM)), a non-volatile memory 1806 (e.g., read-only memory (ROM) or electrically-erasable programmable ROM (EEPROM)), and a data storage device 1816, which may communicate with each other via a bus 1808.

Processing device 1802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1800 may further include a network interface device 1822. Computer system 1800 also may include a video display unit 1810 (e.g., an LCD), an alphanumeric input device 1812 (e.g., a keyboard), a cursor control device 1814 (e.g., a mouse), and a signal generation device 1820.

Data storage device 1816 may include a non-transitory computer-readable storage medium 1824 on which may store instructions 1826 encoding any one or more of the methods or functions described herein, including instructions for implementing method 400 or 500.

Instructions 1826 may also reside, completely or partially, within volatile memory 1804 and/or within processing device 1802 during execution thereof by computer system 1800, hence, volatile memory 1804 and processing device 1802 may also constitute machine-readable storage media.

While computer-readable storage medium 1824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: receiving, by a processing device, at a distribution unit, a first content request from a distribution electronic control unit (ECU) associated with a receiving vehicle, wherein the first content request includes one or more filtering criteria; determining whether a content item that satisfies the filtering criteria is stored on a storage device of the distribution unit; responsive to determining that the content item that satisfies the filtering criteria is not stored on the storage device of the distribution unit: sending, to a MDS, a second content request, wherein the second content request includes the filtering criteria, and receiving, from the MDS, the content item that satisfies the filtering criteria; and sending the content item that satisfies the filtering criteria to the distribution ECU associated with the receiving vehicle.

Example 2 is the method of Example 1, wherein the content item that satisfies the filtering criteria corresponds to a content item version identifier specified by the filtering criteria.

Example 3 is the method of Example 1, wherein the content item that satisfies the content request corresponds to an updated version of a content item associated with a receiving ECU of the receiving vehicle, wherein the receiving ECU of the receiving vehicle is identified by the filtering criteria.

Example 4 is the method of Example 1, wherein the filtering criteria comprise one or more requested content properties, each of the requested content properties comprising one or more of: one or more vehicle properties characterizing the receiving vehicle, or a content item version.

Example 5 is the method of Example 4, wherein the vehicle properties characterizing the receiving vehicle comprise one or more of: a manufacturer of the receiving vehicle, a model identifier of the receiving vehicle, a year of the receiving vehicle, a vehicle identification number (VIN) of the receiving vehicle, one or more ECU type identifiers, each identifying an ECU of the vehicle, one or more ECU version identifiers, each identifying a version of an ECU of the vehicle, or one or more ECU content item version identifiers, each identifying a version of a content item installed in an ECU of the vehicle.

Example 6 is the method of Example 4, wherein the content item that satisfies the filtering criteria is associated with one or more content item properties, and each of the requested content properties corresponds to one of the content item properties associated with the content item.

Example 7 is the method of Example 1, wherein determining whether the content item that satisfies the filtering criteria is stored in a storage device of the distribution unit comprises: searching a content table for the content item that satisfies the content request, wherein the content table comprises one or more content item identifiers and associates each content item identifier with one or more content item properties, and wherein the content item that satisfies the request is associated with one or more particular content item properties that correspond to one or more requested content properties specified by the filtering criteria.

Example 8 is the method of Example 1, wherein sending, to the MDS, the second request comprises: storing, in a pending content request table, a record comprising an identifier associated with the content item, an identifier associated with the distribution unit, an identifier associated with the receiving vehicle, and a request state, wherein the request state indicates an amount of progress of a download of the content item.

Example 9 is the method of Example 8, further comprising: responsive to sending the content item to the distribution ECU associated with the vehicle, removing the record from the pending content request table.

Example 10 is the method of Example 1, further comprising: responsive to receiving, by the processing device, at the distribution unit, the first content request, determining whether a download of the content item to the distribution ECU has been interrupted; and responsive to determining that the download of the content item has been interrupted, resuming the download of the content item in view of download state associated with the content item.

Example 11 is the method of Example 10, wherein determining whether the download of the content item to the distribution ECU has been interrupted comprises searching a pending content request table for a record that includes an identifier of the content item and an identifier of the distribution ECU, wherein the record further comprises the download state.

Example 12 is the method of Example 11, wherein the request comprises a request to subscribe to delivery of content items that satisfy the filtering criteria, the method further comprising: responsive to receiving a notification from the MDS that another content item satisfying the filtering criteria is available, sending, to the MDS, a third content request, wherein the third content request identifies the another content item; receiving, from the MDS, the another content item; and sending the another content item to the distribution ECU associated with the receiving vehicle.

Example 13 is the method of Example 1, wherein the content item comprises program code instructions executable by a receiving ECU of the receiving vehicle.

Example 14 is the method of Example 1, wherein the content item is further identified in view of one or more content items that are installed on the receiving vehicle, and wherein the content item and the one or more content items that are installed on the receiving vehicle form a consistent set of content items for the receiving vehicle.

Example 15 is the method of Example 14, wherein the one or more content items installed on the receiving vehicle are specified by the content request.

Example 16 is the method of Example 14, further comprising: sending, to the MDS, a request for a list of content items installed on the receiving vehicle; and receiving, from the MDS, the list of content items installed on the vehicle and, for each content item installed on the receiving vehicle, a corresponding content version identifier specifying which version of the content item is installed on the receiving vehicle.

Example 17 is the method of Example 1, wherein receiving, by the processing device, at the distribution unit, the first content request comprises: receiving, from the distribution ECU, a message authentication code of the first content request; and verifying, using a public key associated with the distribution ECU, the message authentication code of the first content request.

Example 18 is the method of Example 1, wherein sending, to the MDS, the second content request comprises: generating, using a private key associated with the distribution unit, a message authentication code of the second content request; sending, to the MDS, the message authentication code of the second content request.

Example 19 is the method of Example 1, further comprising: sending, to the MDS, a request for a predicted duration associated with the identified content item; receiving, from the MDS, the predicted duration; updating the predicted duration in view of a bandwidth between the distribution unit and the distribution ECU; sending, to the distribution ECU, the predicted duration; and receiving, from the distribution ECU, a confirmation of the content request.

Example 20 is a system comprising: a memory; and a processing device operatively coupled to the memory, wherein the processing device processes instructions synchronously in accordance with a processor clock, the processing device to: receive, at a MDS, a content item from a content provider system, wherein the content item is associated with one or more received content item properties; identify a distribution unit identifier, wherein the identified distribution unit identifier is associated with one or more filtering criteria, and the received content item properties satisfy the filtering criteria, identify, in view of the distribution unit identifier, a receiving vehicle; identify, in view of the receiving vehicle, one or more first content items that are installed on the receiving vehicle; determine whether the received content item and the one or more first content items form a consistent set of content items for the receiving vehicle; and responsive to determining that the received content item and the one or more first content items form a consistent set of content items for the receiving vehicle, send the content item to the identified distribution unit identifier.

Example 21 is the system of Example 20, wherein the filtering criteria comprise one or more criteria properties, and the criteria properties comprise one or more of: one or more vehicle properties, or a content item version.

Example 22 is the system of Example 21, wherein the received content item properties satisfy the filtering criteria responsive to each of the criteria properties corresponding to one of the received content item properties.

Example 23 is the system of Example 20, wherein each of the received content item properties comprises one or more of: a content item provider identifier, one or more vehicle properties, a content item version, or a content item size.

Example 24 is the system of Example 23, wherein the vehicle properties comprise one or more of: a manufacturer of the receiving vehicle, a model identifier of the receiving vehicle, a year of the receiving vehicle, a vehicle identification number (VIN) of the receiving vehicle, one or more ECU type identifiers, each identifying an ECU of the vehicle, one or more ECU version identifiers, each identifying a version of an ECU of the vehicle, or one or more ECU content item version identifiers, each identifying a version of a content item installed in an ECU of the vehicle.

Example 25 is the system of Example 20, wherein to identify, in view of the distribution unit identifier, the receiving vehicle, the processing device is further to: identify, in a vehicle lookup table, a record that associates the distribution unit identifier with one or more vehicle properties that correspond to the received content item properties, wherein at least one of the vehicle properties of the identified record identifies the receiving vehicle.

Example 26 is the system of Example 25, wherein the one or more first content items that are installed on the receiving vehicle are identified by the vehicle lookup table record that associates the distribution unit identifier with the vehicle properties that correspond to the received content item properties.

Example 27 is the system of Example 20, wherein to determine whether the received content item and the one or more first content items form a consistent set of content items for the receiving vehicle, the processing device is further to: identify, in the one or more first content items, one or more dependent content items, wherein the received content item depends on the one or more dependent content items; determine, according to content item compatibility information, whether the first content item is compatible with each of the dependent content items, wherein the received content item and the one or more first content items form a consistent set responsive to the first content item being compatible with each of the dependent content items.

Example 28 is the system of Example 27, wherein the received content item depends on the one or more dependent content items responsive to the received content item referencing at least one of the one or more dependent content items.

Example 29 is the system of Example 28, wherein each of the dependent content items is associated with a dependent content item version, the first content item is associated with a first content item version, and the first content item is compatible with each of the dependent content items responsive to the first content item version being compatible with each of the dependent content item versions according to content item compatibility information.

Example 30 is the system of Example 20, wherein the processing device is further to: responsive to determining that the received content item and the one or more first content items do not form a consistent set of content items for the receiving vehicle, identify one or more second content items, wherein the second content items and the received content item form a consistent set of content items for the receiving vehicle; and send the second content items to the identified distribution unit.

Example 31 is the system of Example 30, wherein the one or more second content items are identified using the content item compatibility information, and wherein the second content items and the received content item form a consistent set of content items for the receiving vehicle.

Example 32 is the system of Example 31, wherein the processing device is further to: determine, using an available content table, whether the second content items are stored in a data store associated with the MDS; responsive to determining that the second content items are not stored in the data store associated with the MDS, send, to one or more content provider systems, a request for each of the second content items; and receive, from the one or more content provider systems, each of the second content items.

Example 33 is the system of Example 32, wherein the processing device is further to: store, in the available content table, one or more records, each record associating the one of the received content items with the one or more content item properties of the one of the received content items; and store each of the received content items in the data store associated with the MDS.

Example 34 is the system of Example 20, wherein the processing device is further to: store, in an available content table, a record associating the received content item with the one or more content item properties; and store the received content item in a data store associated with the MDS.

Example 35 is the system of Example 20, wherein the processing device is further to: receive, at the MDS, a content request from a distribution unit, wherein the content request comprises one or more filtering criteria, determine whether a content item that satisfies the filtering criteria is stored in a storage device associated with the MDS; and responsive to determining that the content item that satisfies the filtering criteria is stored in the storage device associated with the MDS, send the content item to the distribution unit.

Example 36 is the system of Example 35, wherein the processing device is further to: responsive to determining that the content item that satisfies the filtering criteria is not stored in the storage device associated with the MDS, send, to one or more content provider systems, a request for the content item that satisfies the filtering criteria; receive, from at least one of the content provider systems, the content item that satisfies the filtering criteria; and send the content item to the distribution unit.

Example 37 is a non-tangible, computer-readable medium storing instructions that, when executed by a processing device, cause the processing device to: receive, at a distribution unit, a first content request from a distribution electronic control unit (ECU) associated with a receiving vehicle, wherein the first content request comprises one or more filtering criteria, the filtering criteria identifying a receiving ECU of the receiving vehicle, send, to a MDS, a second content request, wherein the second content request includes the filtering criteria; receive, from the MDS, a content item that satisfies the filtering criteria; and send the content item that satisfies the filtering criteria to the distribution ECU associated with the receiving vehicle.

Example 38 is a system comprising: a memory; and a processing device operatively coupled to the memory, wherein the processing device processes instructions synchronously in accordance with a processor clock, the processing device to: receive, at a MDS, a content request from a distribution unit, wherein the content request comprises one or more filtering criteria, determine whether a content item that satisfies the filtering criteria is stored in a storage device associated with the MDS; and responsive to determining that the content item that satisfies the filtering criteria is stored in the storage device associated with the MDS: retrieve the content item from the storage device associated with the MDS, and send the content item to the distribution unit.

Example 39 is an apparatus comprising: means for receiving, at a distribution unit, a first content request from a distribution electronic control unit (ECU) associated with a receiving vehicle, wherein the first content request includes one or more filtering criteria; means for determining whether a content item that satisfies the filtering criteria is stored on a storage device of the distribution unit; means for, responsive to determining that the content item that satisfies the filtering criteria is not stored on the storage device of the distribution unit: sending, to a MDS, a second content request, wherein the second content request includes the filtering criteria, and receiving, from the MDS, the content item that satisfies the filtering criteria; and means for sending the content item that satisfies the filtering criteria to the distribution ECU associated with the receiving vehicle.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 400, or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, at a distribution unit, a first content request from a distribution electronic control unit (ECU) associated with a vehicle, wherein the first content request specifies one or more filtering criteria, and the filtering criteria include a model identifier of the vehicle;
   determining whether a content item that satisfies the filtering criteria is stored on a storage device associated with the distribution unit;
   responsive to determining that the content item that satisfies the filtering criteria is not stored on the storage device of the distribution unit:
      sending, to a managed content delivery service, a second content request, wherein the second content request reflects the filtering criteria, and
      receiving, from the managed content delivery service, the content item that satisfies the filtering criteria;
   identifying an additional content item that does not satisfy the filtering criteria, wherein the additional content item is a later version of a second content item that is currently installed on the vehicle; and sending, to the distribution ECU associated with the vehicle, the content item, the additional content item, a public key associated with the distribution unit, a hash of the content item and the additional content item, wherein the hash is signed by a private key associated with the distribution unit.

2. The method of claim 1, wherein the filtering criteria comprise one or more of: a content item identifier, a content provider, a content item version, or one or more vehicle properties.

3. The method of claim 2, wherein the vehicle properties comprise one or more of:
a manufacturer of the vehicle,
a year of the vehicle,
a vehicle identification number (VIN) of the vehicle,
one or more ECU type identifiers, each identifying an ECU of the vehicle,
one or more ECU version identifiers, each identifying a version of an ECU of the vehicle, or
one or more ECU content item version identifiers, each identifying a version of the second content item installed in an ECU of the vehicle.

4. The method of claim 1, wherein determining whether the content item that satisfies the filtering criteria is stored in the storage device of the distribution unit comprises:
searching a content table for the content item that satisfies the first content request,
wherein the content table comprises one or more content item identifiers and associates each content item identifier with one or more content item data values, and
wherein the content item that satisfies the first content request is characterized by one or more content item data values that match one or more criteria values associated with the filtering criteria.

5. The method of claim 1, wherein the content item comprises program code instructions executable by an ECU of the vehicle.

6. The method of claim 1, wherein sending, to the managed content delivery service, the second content request comprises:
generating, using the private key associated with the distribution unit, a message authentication code of the second content request; and
sending, to the managed content delivery service, the message authentication code of the second content request.

7. The method of claim 1, wherein determining whether a content item that satisfies the filtering criteria is stored on the storage device associated with the distribution unit comprises determining whether the content item that satisfies the filtering criteria is included in a content cache associated with the distribution unit.

8. The method of claim 7, further comprising: responsive to receiving, from the managed content delivery service, the content item that satisfies the filtering criteria, storing the content item that satisfies the filtering criteria in the content cache associated with the distribution unit.

9. A system comprising:
a memory; and
one or more processors operatively coupled to the memory, the one or more processors configured to:
receive, at a distribution unit, a first content request from a distribution electronic control unit (ECU) associated with a vehicle, wherein the first content request specifies one or more filtering criteria, and the filtering criteria include a model identifier of the vehicle;
determine whether a content item that satisfies the filtering criteria is stored on a storage device associated with the distribution unit;
responsive to determining that the content item that satisfies the filtering criteria is not stored on the storage device of the distribution unit:
send, to a managed content delivery service, a second content request, wherein the second content request reflects the filtering criteria, and
receive, from the managed content delivery service, the content item that satisfies the filtering criteria;
identify an additional content item that does not satisfy the filtering criteria, wherein the additional content item is a later version of a second content item that is currently installed on the vehicle; and
send, to the distribution ECU associated with the vehicle, the content item, the additional content item, a public key associated with the distribution unit, a hash of the content item and the additional content item, wherein the hash is signed by a private key associated with the distribution unit.

10. The system of claim 9, wherein the filtering criteria comprise one or more of: a content item identifier, a content provider, a content item version, or one or more vehicle properties.

11. A non-transitory machine-readable storage medium storing instructions that, when executed by one or more processors, cause the one or more processors to:
receive, at a distribution unit, a first content request from a distribution electronic control unit (ECU) associated with a vehicle, wherein the first content request specifies one or more filtering criteria, and the filtering criteria include a model identifier of the vehicle;
determine whether a content item that satisfies the filtering criteria is stored on a storage device associated with the distribution unit;
responsive to determining that the content item that satisfies the filtering criteria is not stored on the storage device of the distribution unit:
send, to a managed content delivery service, a second content request, wherein the second content request reflects the filtering criteria, and
receive, from the managed content delivery service, the content item that satisfies the filtering criteria;
identify an additional content item that does not satisfy the filtering criteria, wherein the additional content item is a later version of a second content item that is currently installed on the vehicle; and
send, to the distribution ECU associated with the vehicle, the content item, the additional content item, a public key associated with the distribution unit, and a hash of the content item and the additional content item, wherein the hash is signed by a private key associated with the distribution unit.

12. The non-transitory machine-readable storage medium of claim 11, wherein the filtering criteria comprise one or more of: a content item identifier, a content provider, a content item version, or one or more vehicle properties.

13. The non-transitory machine-readable storage medium of claim 12, wherein the vehicle properties comprise one or more of:
a manufacturer of the vehicle,
a year of the vehicle,
a vehicle identification number (VIN) of the vehicle, one or more ECU type identifiers, each identifying an ECU of the vehicle, one or more ECU version identifiers, each identifying a version of an ECU of the vehicle, or one or more ECU content item version identifiers, each identifying a version of the additional content item installed in an ECU of the vehicle.

14. The non-transitory machine-readable storage medium of claim 11, determining whether the content item that satisfies the filtering criteria is stored in the storage device of the distribution unit further comprises:

search a content table for the content item that satisfies the first content request, wherein the content table comprises one or more content item identifiers and associates each content item identifier with one or more content item data values, and wherein the content item that satisfies the first content request is characterized by one or more content item data values that match one or more criteria values associated with the filtering criteria.

15. The non-transitory machine-readable storage medium of claim 11, wherein the content item comprises program code instructions executable by an ECU of the vehicle.

16. The non-transitory machine-readable storage medium of claim 11, wherein sending, to the managed content delivery service, the second content request further comprises:

generate, using the private key associated with the distribution unit, a message authentication code of the second content request; and send, to the managed content delivery service, the message authentication code of the second content request.

* * * * *